(12) United States Patent
Miyauchi et al.

(10) Patent No.: US 7,940,632 B2
(45) Date of Patent: May 10, 2011

(54) RECORDING MEDIUM, DATA USE LIMITATING METHOD, AND PROGRAM

(75) Inventors: Tsutomu Miyauchi, Kanagawa (JP);
Jun Sawai, Kanagawa (JP); Tsutomu Shimosato, Kanagawa (JP)

(73) Assignee: Sony Corporation (JP)

( * ) Notice: Subject to any disclaimer, the term of this patent is extended or adjusted under 35 U.S.C. 154(b) by 400 days.

(21) Appl. No.: 12/287,080

(22) Filed: Oct. 6, 2008

(65) Prior Publication Data
US 2009/0097386 A1 Apr. 16, 2009

(30) Foreign Application Priority Data
Oct. 10, 2007 (JP) .............................. P2007-264005

(51) Int. Cl.
*G11B 7/26* (2006.01)
(52) U.S. Cl. .................................................. 369/272.1
(58) Field of Classification Search ................ 369/272.1
See application file for complete search history.

(56) References Cited

U.S. PATENT DOCUMENTS

| | | | |
|---|---|---|---|
| 6,996,077 B1 * | 2/2006 | Suenaga et al. | 370/320 |
| 7,391,693 B2 * | 6/2008 | Hashimoto | 369/53.31 |
| 2002/0013905 A1 * | 1/2002 | Hamada | 713/185 |
| 2004/0076105 A1 * | 4/2004 | King et al. | 369/96 |

FOREIGN PATENT DOCUMENTS

| | | |
|---|---|---|
| JP | 11027751 A | 1/1999 |
| JP | 2001-143040 A | 5/2001 |
| JP | 2001-228528 A | 8/2001 |
| JP | 2003-099400 A | 4/2003 |
| JP | 2003-242041 A | 8/2003 |
| JP | 2004310207 A | 11/2004 |
| JP | 2005157476 A | 6/2005 |
| JP | 2005-209109 A | 8/2005 |
| JP | 2005-222112 A | 8/2005 |
| JP | 2006144421 A | 6/2006 |
| JP | 2007-034685 A | 2/2007 |

OTHER PUBLICATIONS

Office Action from Japanese Application No. 2007-264005, dated Jul. 6, 2010.
Office Action from Japanese Application No. 2007-264005, dated Feb. 25, 2010.

* cited by examiner

*Primary Examiner* — Mark Blouin
(74) *Attorney, Agent, or Firm* — Lerner, David, Littenberg, Krumholz & Mentlik, LLP

(57) ABSTRACT

A recording medium in which data supplied from an information processing device is recorded includes: position detecting means for detecting a position of the recording medium; user authentication means for authenticating a user intending to use the data; recording means for recording data use limitation information; and data use limitation control means for controlling the limitation on the user's use of data on the basis of the data use limitation information.

8 Claims, 15 Drawing Sheets

FIG. 8

| | X0, X1 | Y0, Y1 | Z0, Z1 | DATA HOLDING LEVEL (FOR AUTHENTICATED USER) | DATA HOLDING LEVEL (FOR NON-AUTHENTICATED USER) |
|---|---|---|---|---|---|
| STUDIO A | | SPECIFICATION OF COORDINATE RANGE | | 3 | 2 |
| STUDIO B | | | | 1 | 0 |
| STUDIO C | | | | 3 | 2 |
| PASSAGE | | | | 1 | 1 |
| STOREHOUSE | | | | 1 | 0 |
| RECEPTION ROOM | | | | 2 | 1 |
| OUTDOORS | | | | 1 | 0 |

84

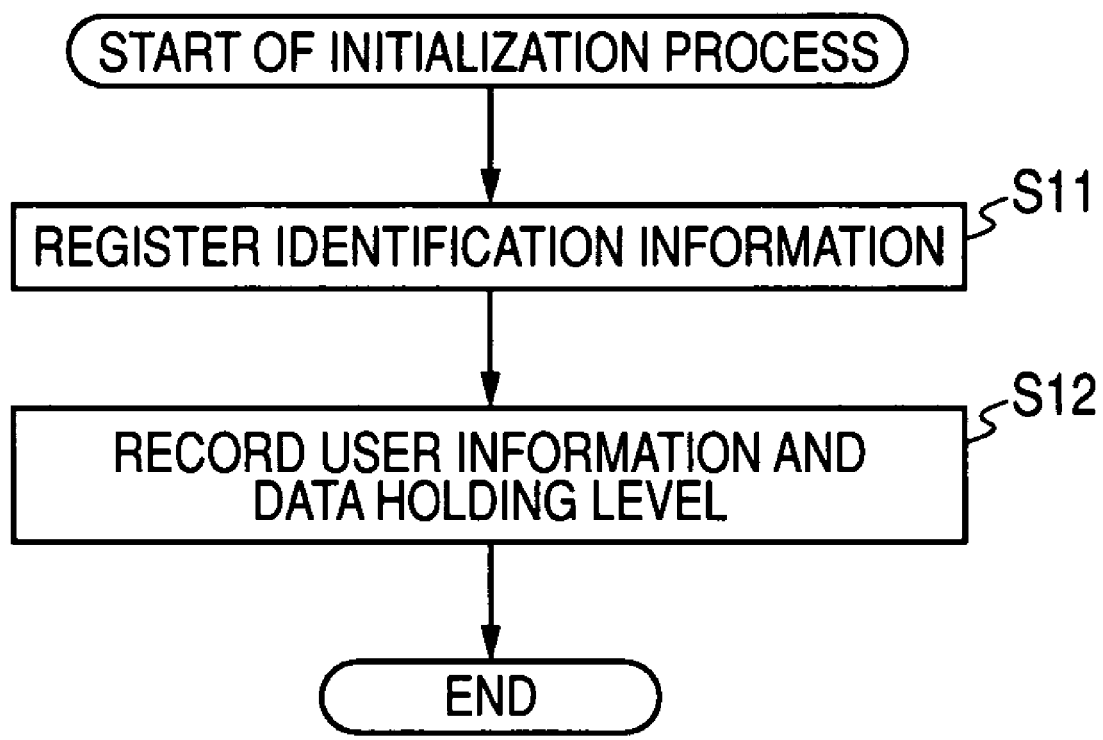

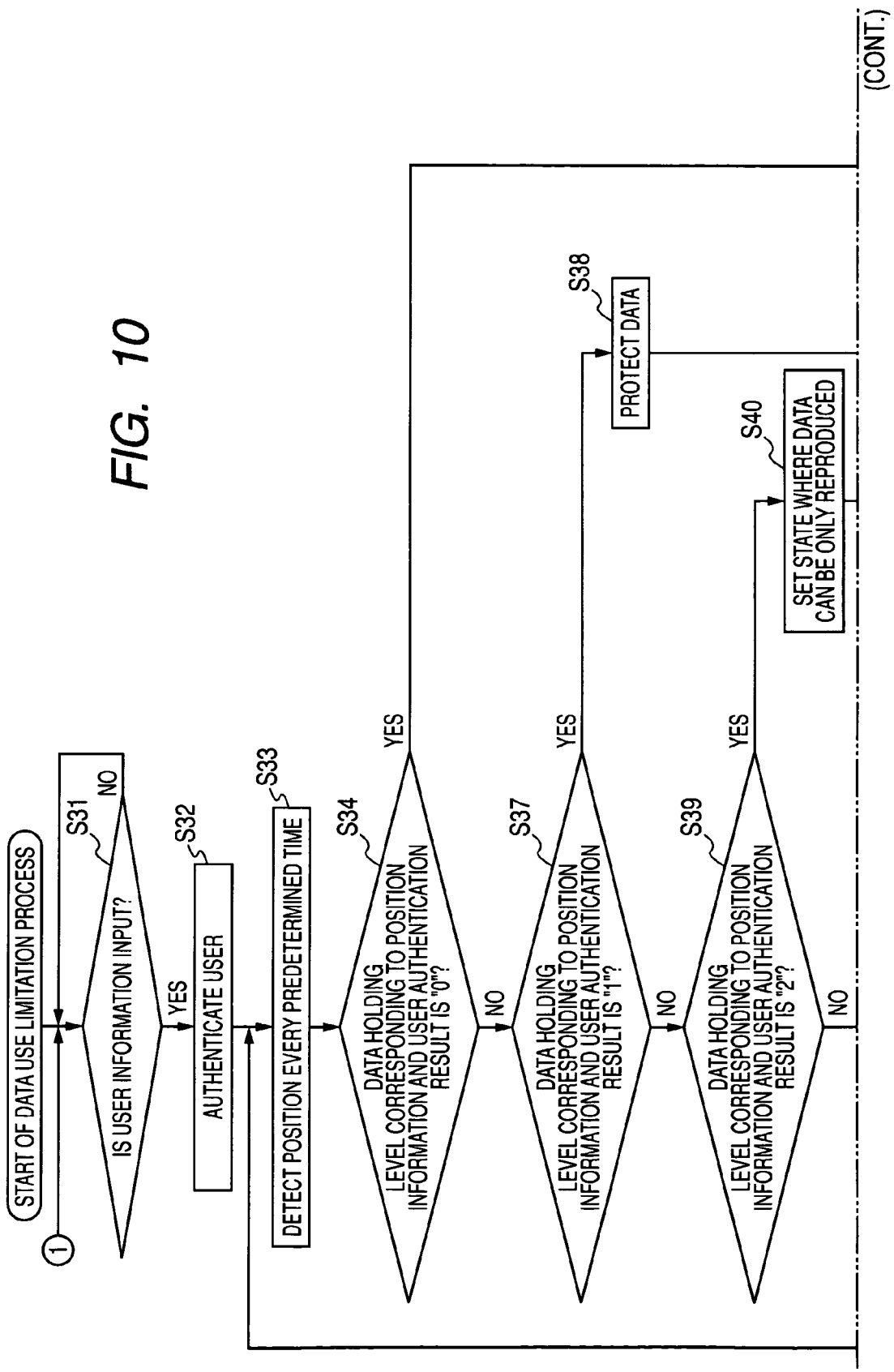

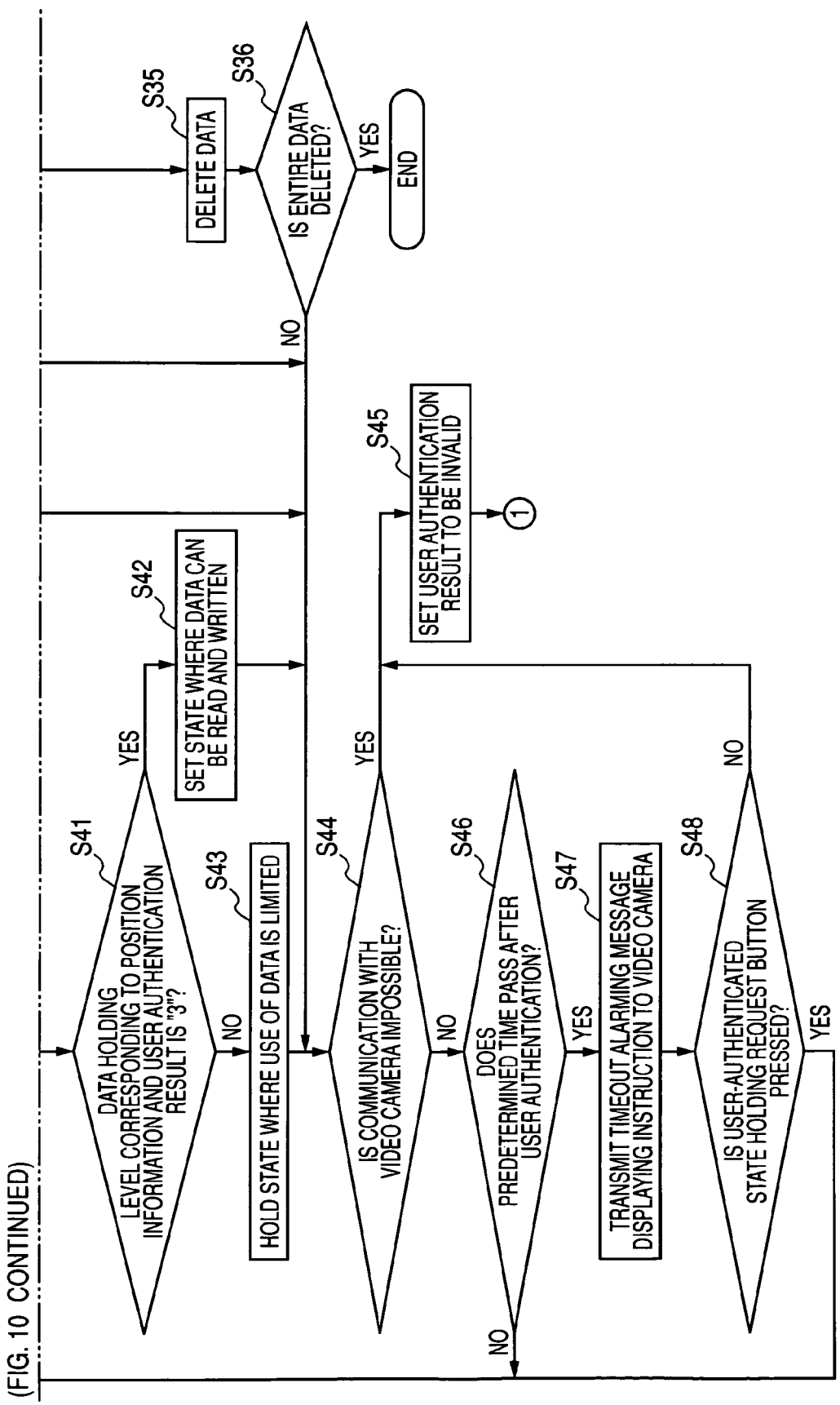

RECORDING MEDIUM, DATA USE LIMITING METHOD, AND PROGRAM

CROSS REFERENCE TO RELATED APPLICATION

The present application claims priority from Japanese Patent Application No. JP 2007-264005 filed in the Japanese Patent Office on Oct. 10, 2007, the entire content of which is incorporated herein by reference.

BACKGROUND OF THE INVENTION

1. Field of the Invention

The present invention relates to a recording medium, a data use limiting method, and a program, and more particularly, to a recording medium, a data use limiting method, and a program that can enhance concealment and security of data recorded in a recording medium.

2. Description of the Related Art

In an imaging apparatus having a position detector such as a global positioning system (GPS), captured images are classified into groups by correlating the images with position information thereof and are recorded in a recording medium, thereby enhancing the efficiency in retrieval of images (for example, see JP-A-2001-228528).

In general, the recording medium is configured to maintain the concealment of data by authentication using a password or a fingerprint.

SUMMARY OF THE INVENTION

However, when a recording medium gets stolen and the password thereof is stolen a look at or a pseudo fingerprint imitating the fingerprint is prepared, data recorded in the recording medium could be easily seen or falsified.

In the past, there was no recording medium having such a function enhancing the concealment and security of data by providing a position detector to the recording medium and detecting that the recording medium is taken out of a designated place due to, for example, theft, by the use of the-position information recognized by the recording medium.

In view of the above-mentioned problem, it is desirable to enhance the concealment and security of data recorded in a recording medium.

According to an embodiment of the invention, there is provided a recording medium on which data supplied from an information processing device is recorded or a program allowing a computer to serve as the recording medium, the recording medium including: position detecting means for detecting a position of the recording medium; user authentication means for authenticating a user intending to use the data; recording means for recording a data use limitation level table in which a data use limitation level indicating a degree of limitation on the use of data is correlated with area information indicating an area and the authentication result; and data use limitation control means for controlling the limitation on the user's use of data on the basis of the data use limitation level correlated with the area information including the position detected by the position detecting means and the authentication result of the user authentication means.

In the recording medium, the data use limitation level table may be recorded in the unit of data or in the unit of folders including a plurality of data.

The data use limitation level may include a level in which the data can be recorded, reproduced, and edited, a level in which the data can be only reproduced, a level in which the data cannot be recorded, reproduced, or edited, and a level in which the data is deleted.

According to another embodiment of the invention, there is provided a data use limitation method in a recording medium on which data supplied from an information processing device is recorded, the method including the steps of: detecting a position of the recording medium; authenticating a user intending to use the data; recording a data use limitation level table in which a data use limitation level indicating a degree of limitation on the use of data is correlated with area information indicating an area and the authentication result; and controlling the limitation on the user's use of data on the basis of the data use limitation level correlated with the area information including the detected position and the authentication result.

In the embodiments of the invention, a position of the recording medium is detected, a user intending to use the data is authenticated, a data use limitation level table is recorded in which a data use limitation level indicating a degree of limitation on the use of data is correlated with area information indicating an area and the authentication result, and the limitation on the user's use of data is controlled on the basis of the data use limitation level correlated with the area information including the position detected by the position detecting means and the authentication result of the user authentication means.

According to the embodiments of the invention, it is possible to record data in the recording medium and to enhance the concealment and security of the data recorded in the recording medium.

BRIEF DESCRIPTION OF THE DRAWINGS

FIG. 8 is a diagram illustrating a data holding level table.

FIG. 9 is a flowchart illustrating a process of initializing a recording medium.

FIG. 10 is a flowchart illustrating a process of limiting the use of data.

DESCRIPTION OF THE PREFERRED EMBODIMENTS

Figure 1:
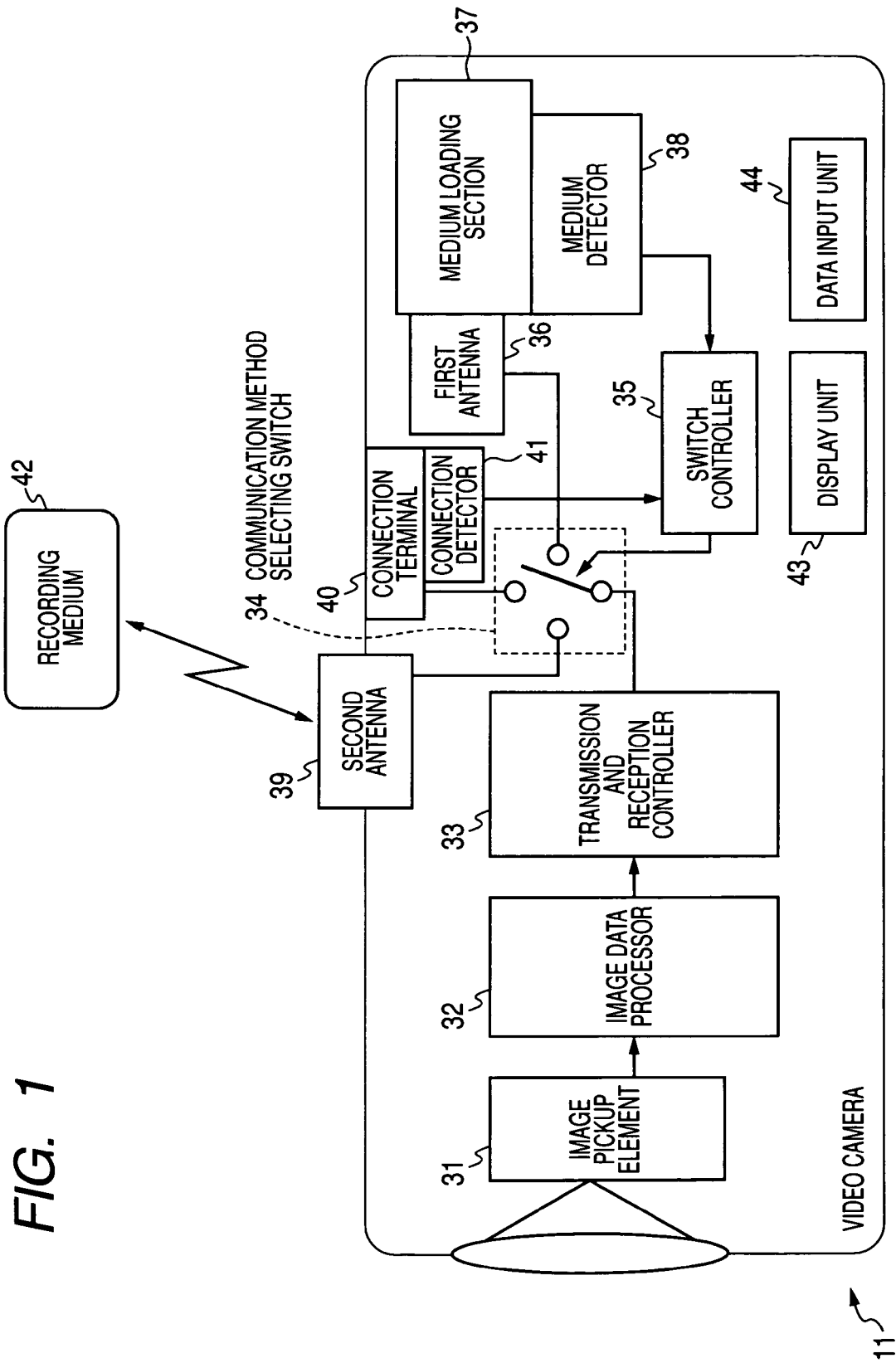
FIG. 1 is a block diagram illustrating a configuration of a video camera to which an embodiment of the invention is applied.

Hereinafter, embodiments of the invention will be described. The following correspondence exists between the constituent elements of the invention and the embodiments described in the specification or drawings. The description is intended to confirm that the embodiments supporting the invention are described in the specification or the drawings. Accordingly, even when an embodiment is described in the specification or the drawings but is not described herein as the embodiment of the constituent element of the invention, it does not mean that the embodiment does not correspond to the constituent element. On the contrary, even when an embodiment is described herein to correspond to the constituent embodiment, it does not mean that the embodiment does not correspond to a constituent element other than the constituent embodiment.

A recording medium or a program according to an embodiment of the invention are a recording medium (for example, a recording medium 42 in FIG. 2) on which data supplied from an information processing device is recorded or a program allowing a computer to serve as the recording medium includes: position detecting means (for example, a position detector in FIG. 2) for detecting a position of the recording medium; user authentication means (for example, a user authentication section 63 in FIG. 2) for authenticating a user intending to use the data; recording means (for example, a recording section 61 in FIG. 2) for recording a data use limitation level table in which a data use limitation level indicating a degree of limitation on the use of data is correlated with area information indicating an area and the authentication result; and data use limitation control means (for example, a controller 66 in FIG. 2) for controlling the limitation on the user's use of data on the basis of the data use limitation level correlated with the area information including the position detected by the position detecting means and the authentication result of the user authentication means, and a program allowing a computer to serve as the recording medium, respectively.

A data use limitation method according to another embodiment of the invention is provided a data use limitation method in a recording medium on which data supplied from an information processing device is recorded, the method including the steps of: detecting a position of the recording medium (for example, step S33 in FIG. 10); authenticating a user intending to use the data (for example, step S32 in FIG. 10); recording a data use limitation level table in which a data use limitation level indicating a degree of limitation on the use of data is correlated with area information indicating an area and the authentication result; and controlling the limitation on the user's use of data on the basis of the data use limitation level correlated with the area information including the detected position and the authentication result (for example, step S35, step S38, step S40, and step S42 in FIG. 10).

Hereinafter, embodiments of the invention will be described with reference to the accompanying drawings.

FIG. 1 is a block diagram illustrating a configuration of a video camera to which an embodiment of the invention is applied.

In FIG. 1, a video camera 11 includes an imaging device 31, an image data processor 32, a transmission and reception controller 33, a communication method selecting switch 34, a switch controller 35, a first antenna 36, a medium loading section 37, a medium detector 38, a second antenna 39, a connection terminal 40, a connection detector 41, a recording medium 42, a display unit 43, and a data input section 44.

The imaging device 31 includes a photoelectric conversion element such as a charge coupled device (CCD) or complementary metal-oxide semiconductor (CMOS) sensor and an optical system for focusing an optical image of a subject on the photoelectric conversion element, and serves to convert a beam corresponding to the received image of the subject into image data as an electrical signal and to supply the converted image data to the image data processor 32.

The image data processor 32 performs a predetermined image process on the image data supplied from the imaging device 31 and supplies the image data to the transmission and reception controller 33. The image data processor 32 can perform processes such as the lateral inversion of an image or the vertical inversion of an image on the image data, in addition to deformation of an image including enlargement, reduction, and change in magnification, rotation, color inversion, synthesis, and partial replacement, and can also perform processes such as displaying a color image in gray scales, changing contrast, brightness, and saturation, binarizing an image, and filtering or masking image data.

The transmission and reception controller 33 supplies image data supplied from the image data processor 32 or information supplied from the data input section 44 to the communication method selecting switch 34 so as to supply or transmit the image data or information to the recording medium 42 through one of the first antenna 36, the second antenna 39, and the connection terminal 40.

The communication method selecting switch 34 selects one of the first antenna 36, the second antenna 39, and the connection terminal 40 in accordance with an instruction from the switch controller 35, and connects the selected one to the transmission and reception controller 33.

The switch controller 35 supplies the instruction for selecting one of the first antenna 36, the second antenna 39, and the connection terminal 40 to the communication method selecting switch 34.

More specifically, when information indicating that the loading of the recording medium 42 to the medium loading section 37 to which the recording medium 42 can be loaded is detected is supplied from the medium detector 38, the switch controller 35 supplies an instruction for selecting the first antenna 36 to the communication method selecting switch 34.

When information indicating that the connection of the recording medium 42 to the connection terminal 40 is detected is supplied from the connection detector 41, the switch controller 35 supplies an instruction for selecting the connection terminal 40 to the communication method selecting switch 34.

When the information indicating that the loading of the recording medium 42 to the medium loading section 37 is detected is not supplied from the medium detector 38 and the information indicating that the connection of the recording medium 42 to the connection terminal 40 is detected is not supplied from the connection detector 41, but for example, operation information indicating that the second antenna 39 is selected is input from an operation input section not shown and operated by a user, the switch controller 35 supplies an instruction for selecting the second antenna 39 to the communication method selecting switch 34.

The first antenna 36 is a proximity-range communication antenna for sending and receiving information to and from the recording medium 42 loaded in the medium loading section 37. The first antenna includes, for example, a micro strip line antenna with a limited propagation characteristic, by which the first antenna can communicate with only one recording medium 42 disposed in proximity to the first antenna by loading the recording medium 42 into the medium loading section 37.

The medium loading section 37 is configured to detachably load only one recording medium 42 within a communicable range of the first antenna 36.

The medium detector 38 detects that the recording medium 42 is loaded into the medium loading section 37 and supplies the information indicating that the loading of the recording medium 42 into the medium loading section 37 to the switch controller 35.

The second antenna 39 is a short-range communication antenna for sending and receiving information to and from the recording medium 42 by wireless communication. The second antenna includes, for example, an antenna for UWB (Ultra Wide Band) communication or wireless communication based on IEEE (Institute of Electrical and Electronics Engineers) 802.11b.

The connection terminal 40 includes a wired connection terminal such as a USB (Universal Serial Bus) terminal and an IEEE 1394 terminal or a wireless connection terminal such as Bluetooth, is connected to the recording medium 42 (the communication is made in a very small distance in the wireless communication) and a device having the same specification of terminal.

The connection detector 41 detects that the recording medium 42 is connected to the connection terminal 40 and supplies the information indicating that the connection of the recording medium 42 to the connection terminal 40 is detected to the switch controller 35.

The recording medium 42 stores a variety of information or data supplied or transmitted through one of the first antenna 36, the second antenna 39, and the connection terminal 40.

The display unit 43 displays an image (so-called through image) corresponding to the image signal currently acquired (imaged) by the imaging device 31. The display unit 43 displays a GUI (Graphical User Interface) used by a user so as to input data, data recorded in the recording medium 42 or the like.

The data input section 44 supplies information on operation details to the sections in accordance with the user's operation on the operation input section not shown.

The data input section 44 receives user information used to specify a user intending to use the video camera 11 and the recording medium 42 (data recorded therein) and supplies the user information to the transmission and reception controller 33. Here, the user information includes biological information such as a fingerprint pattern, or a user ID (Identification) to be read by a non-contact card reader not shown, or a password input from a keyboard not shown.

The data input section 44 receives identification information for identifying the recording medium 42 and supplies the identification information to the transmission and reception controller 33.

The data input section 44 receives setting information on a data holding level indicating a degree of limitation on the use of data recorded in the recording medium 42 depending on the position of the recording medium 42 and supplies the setting information to the transmission and reception controller 33.

Details of the data holding level will be described later.

The user information, the identification information, and the setting information on a data holding level supplied to the transmission and reception controller 33 are transmitted to the recording medium 42 from the transmission and reception controller 33.

Figure 2:
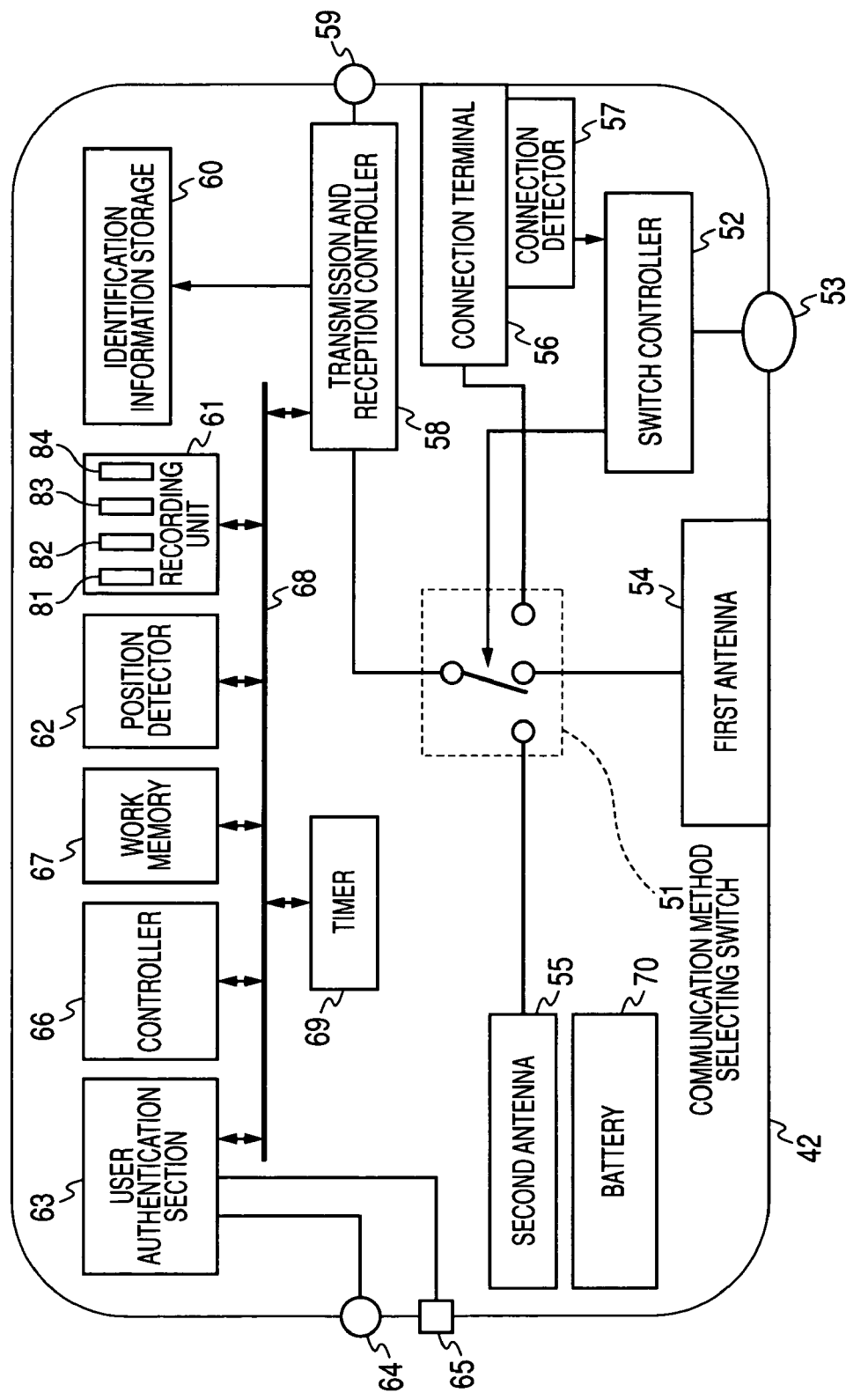
FIG. 2 is a block diagram illustrating a configuration of a recording medium.

FIG. 2 is a block diagram illustrating a configuration of the recording medium 42.

In FIG. 2, the recording medium 42 includes a communication method selecting switch 51, a switch controller 52, a loading detection switch 53, a first antenna 54, a second antenna 55, a connection terminal 56, a connection detector 57, a transmission and reception controller 58, an access displaying LED (Light Emitting Diode) 59, an identification information storage 60, a recording section 61, a position detector 62, a user authentication section 63, a user-authenticated state displaying LED 64, a user-authenticated state holding request button 65, a controller 66, a work memory 67, a bus 68, a timer 69, and a battery 70.

In the recording medium 42 shown in FIG. 2, the transmission and reception controller 58, the recording section 61, a position detector 62, the user authentication section 63, the controller 66, the work memory 67, and the timer 69 are connected to each other through the bus 68.

The communication method selecting switch 51 selects one of the first antenna 54, the second antenna 55, and the connection terminal 56 in accordance with an instruction from the switch controller 52, and connects the selected one to the transmission and reception controller 58.

The switch controller 52 supplies an instruction for selecting one of the first antenna 54, the second antenna 55, and the connection terminal 56 to the communication method selecting switch 51.

More specifically, when the information indicating that the loading of the recording medium 42 into the medium loading section 37 of the video camera 11 is detected is supplied from the loading detection switch 53, the switch controller 52 supplies an instruction for selecting the first antenna 54 to the communication method selecting switch 51.

When the information indicating that the connection of the recording medium 42 to the connection terminal 40 of the video camera 11 through the connection terminal 56 is detected is supplied from the connection detector 57, the switch controller 52 supplies an instruction for selecting the connection terminal 56 to the communication method selecting switch 51.

When the information indicating that the loading of the recording medium 42 to the medium loading section 37 of the video camera 11 is detected is not supplied from the loading detection switch 53 and the information indicating that the connection of the recording medium 42 to the connection terminal 40 of the video camera 11 through the connection terminal 56 is detected is not supplied from the connection detector 57, the switch controller 52 supplies an instruction for selecting the second antenna 55 to the communication method selecting switch 51.

The loading detection switch 53 detects that the recording medium 42 is loaded into the medium loading section 37 of the video camera 11 and supplies information indicating that the loading into the video camera 11 is detected to the switch controller 52.

The first antenna 54 is a proximity-range communication antenna for sending and receiving information to and from the video camera 11 through the first antenna 36 in a state where the recording medium 42 is loaded into the medium loading section 37 of the video camera 11. The first antenna 54 includes, for example, a micro strip line antenna electromagnetically coupled to the first antenna 36, which is disposed in proximity to the first antenna 54 by loading the recording medium 42 into the medium loading section 37 of the video camera 11, of the video camera 11.

The second antenna 55 is a short-range communication antenna for allowing the recording medium 42 to send and receive information to and from the video camera 11 through the second antenna 39. The second antenna 55 includes, for example, an antenna for UWB communication or wireless communication based on IEEE 802.11b.

The connection terminal 56 includes a wired connection terminal such as a USB terminal and an IEEE 1394 terminal and a wireless connection terminal such as Bluetooth, and is connected to the connection terminal 40 of the video camera 11 (communication is made within a very small distance in the wireless communication) and a personal computer or a reproducing device having the same specification of terminal.

The connection detector 57 detects that the video camera 11 is connected to the connection terminal 56 and supplies the information indicating that the connection of the video camera 11 to the connection terminal 56 is detected to the switch controller 52.

The transmission and reception controller 58 is supplied with a variety of information or data received by the first antenna 54, the second antenna 55, or the connection terminal 56 via the communication method selecting switch 51.

When image data is supplied via the communication method selecting switch 51, the transmission and reception controller 58 supplies the image data to a data recording area 81 of the recording section 61 via the bus 68.

When user information is supplied via the communication method selecting switch 51, the transmission and reception controller 58 supplies the user information to a user authentication information recording area 83 of the recording section 61.

When setting information on a data holding level is supplied via the communication method selecting switch 51, the transmission and reception controller 58 supplies the setting information on a data holding level to the data holding level table 84 of the recording section 61.

When identification information is supplied via the communication method selecting switch 51, the transmission and reception controller 58 supplies the identification information to the identification information storage 60.

The access displaying LED 59 is blinked when being sending and receiving data via the second antenna 55 in a state where the recording medium 42 is separated from the video camera 11. Accordingly, when a plurality of different recording media similar to the recording medium 42 exists in the vicinity of the recording medium 42, a user can easily recognize which recording medium the video camera 11 sends and receives to and from.

The identification information storage 60 stores the identification information supplied from the transmission and reception controller 58.

The recording section 61 records a variety of data supplied from the sections via the bus 68.

The recording section 61 includes a data recording area 81, a position information recording area 82, a user authentication information recording area 83, and a data holding level table 84. The data recording area 81, the position information recording area 82, the user authentication information recording area 83, and the data holding level table 84 may be formed of different memories, respectively.

The image data or the like supplied from the transmission and reception controller 58 via the bus 68 is recorded in the data recording area 81.

The position information periodically supplied from the position detector 62 via the bus 68 is recorded in the position information recording area 82.

The user information supplied from the transmission and reception controller 58 via the bus 68 is recorded in the user authentication information recording area 83. A user authentication flag indicating whether the authentication of a user is correctly made is recorded in the user authentication information recording area 83. The user authentication flag is turned on by allowing the user authentication section 63 to authenticate a user and is turned off when a predetermined time passes after the authentication of a user is made.

The setting information on a data holding level supplied from the transmission and reception controller 58 via the bus 68, that is, area information indicating an area and a data holding level indicating a degree of limitation on the use of data in the data recording area 81 and correlated with the user authentication result, is set in the data holding level table 84.

The position detector 62 detects the position of the recording medium 42 every predetermined time instructed by the timer 69 and supplies the position information indicating the position to the recording section 61 via the bus 68. The position detector 62 detects the position of the recording medium 42, for example, by GPS communication or UWB communication. Details thereof will be described later with reference to FIGS. 3 to 6.

The user authentication section 63 authenticates a user on the basis of the user information of the user intending to use the recording medium 42 (data thereof) and being input from the video camera 11, which the recording medium 42 is loaded into or connected to, and the user information recorded in the user authentication information recording area 83 of the recording section 61.

More specifically, for example, the user authentication section 63 authenticates the user by combining a fingerprint patter detected by an operation input section not shown, which is disposed in the video camera 11 into or to which the recording medium 42 is loaded or connected and has a mechanism for detecting a user's fingerprint pattern, with a fingerprint pattern as the user information recorded in advance in the user authentication information recording area 83.

For example, the user authentication section 63 authenticates the user by combining a user ID read by the non-contact card reader connected to the video camera 11, which the recording medium 42 is loaded into or connected to, with a user ID as the user information recorded in advance in the user authentication information recording area 83.

For example, the user authentication section 63 authenticates the user by combining a password input from the operation input section not shown of the video camera 11, which the recording medium 42 is loaded into or connected to, with a password as the user information recorded in advance in the user authentication information recording area 83.

When the user authentication is correctly made, the user authentication section 63 turns on the user authentication flag of the user authentication information recording area 83 via the bus 68 and supplies a lighting instruction to the user-authenticated state displaying LED 64. On the other hand, when the user authentication is not correctly made, the user authentication section 63 turns off the user authentication flag of the user authentication information recording area 83 via the bus 68 and supplies an extinction instruction to the user-authenticated state displaying LED 64.

When a predetermined time passes after the user authentication is made, the user authentication section 63 supplies a blinking instruction to the user-authenticated state displaying LED 64 and supplies or transmits an instruction for displaying a timeout alarming message indicating that the user-authenticated time soon expires to the video camera 11 through the bus 68, the transmission and reception controller 58, and one of the first antenna 54, the second antenna 55, and the connection terminal 56. At this time, the display unit 43 of the video camera 11 displays the timeout alarming message on the basis of the instruction for displaying the timeout alarming message, which is supplied or transmitted from the recording medium 42.

When a user confirms the timeout alarming message on the display unit 43 of the video camera 11 or the blinking of the user-authenticated state displaying LED 64 and intends to hold the user-authenticated state where the user is authenticated, the user operates the user-authenticated state holding request button 65. When the user-authenticated state holding request button 65 is operated by the user, information for holding the user-authenticated state is supplied to the user authentication section 63 from the user-authenticated state holding request button 65. Then, when the user authentication is successful, the user authentication section 63 keeping the turning-on of the user authentication flag of the user authentication information recording area 83 and supplies a lighting instruction to the user-authenticated state displaying LED 64.

When a predetermined time passes after the user authentication is made and the user-authenticated state holding request button 65 is not operated or the communication with the video camera 11 is disabled within the predetermined time passes, the user authentication section 63 turns off the user authentication flag of the user authentication information recording area 83 via the bus 68 and supplies an extinction instruction to the user-authenticated state displaying LED 64.

The user-authenticated state displaying LED 64 is lighted, blinked, or extinguished in accordance with the instruction from the user authentication section 63.

When the user inputs information indicating that the user-authenticated state is held, the user-authenticated state holding request button 65 is made to work. When the user-authenticated state holding request button 65 is pressed, the information indicating that the user-authenticated state should be held is supplied to the user authentication section 63 from the user-authenticated state holding request button 65.

The controller 66 controls the limitation on the user's use of data in the data recording area 81 on the basis of the area information including the position information of the position information recording area 82 and the data holding level that is the authentication result of the user authentication section 63 and that is correlated with the user authentication flag of the user authentication information recording area 83 in the data holding level table 84.

More specifically, the controller 66 allows data recorded in the data recording area 81 to be recorded, reproduced, and edited, or to be only reproduced, or to be protected from the recording, reproducing, and editing, or to be deleted, on the basis of the periodically recorded position information and the data holding level in the data holding level table 84 corresponding to the user information.

The work memory 67 temporarily stores a program allowing the sections of the recording medium 42 to operate or to temporarily store necessary data.

The timer 69 performs a counting operation, or performs an interrupt process every predetermined time for recording the position information, or counts down the time after the user authenticating process is performed.

The battery 70 is a power source of the recording medium 42 and supplies power to the sections of the recording medium 42.

Figure 3:
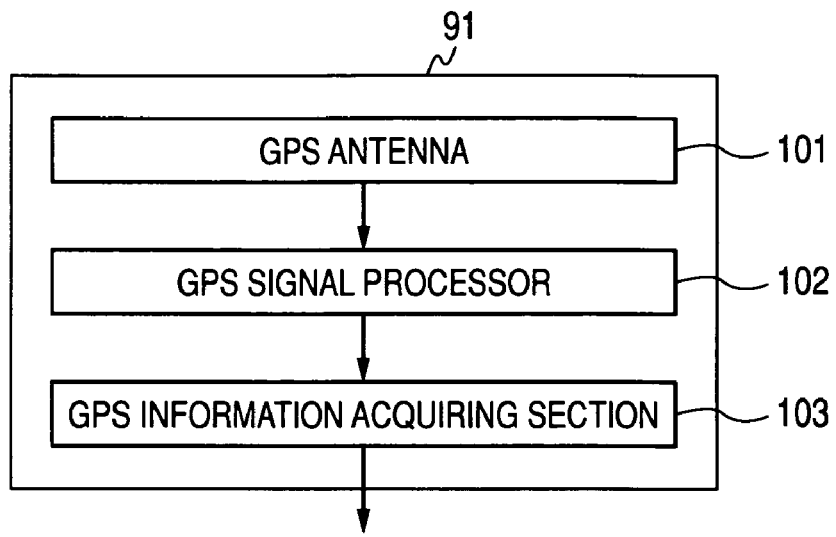
FIG. 3 is a block diagram illustrating a configuration of a GPS communication section constituting a position detector.

FIG. 3 is a block diagram illustrating a first configuration of the position detector 62.

In FIG. 3, the position detector 62 includes a GPS communication section 91.

In FIG. 3, the GPS communication section 91 includes a GPS antenna 101, a GPS signal processor 102, and a GPS information acquiring section 103.

The GPS antenna 101 receives a GPS signal transmitted from a GPS satellite not shown.

The GPS signal processor 102 calculates GPS reception data such as a latitude, a longitude, and an altitude of a present position of the recording medium 42 from the GPS signal received by the use of the GPS antenna 101.

The GPS information acquiring section 103 acquires the GPS reception data from the GPS signal processor 102 and supplies the GPS reception data as the position information to the recording section 61 (FIG. 2).

By the use of the GPS communication section 91 shown in FIG. 3, it is possible to detect the position of the recording medium 42 particularly outdoors.

Figure 4:
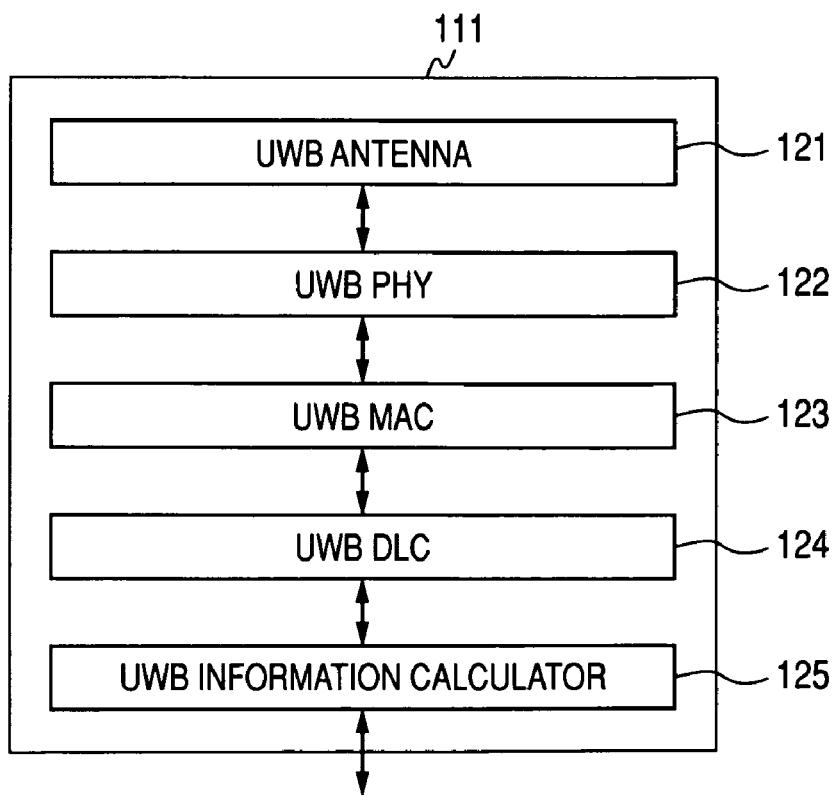
FIG. 4 is a block diagram illustrating a configuration of a UWB communication section constituting the position detector.

FIG. 4 is a block diagram illustrating a second configuration of the position detector 62.

In FIG. 4, the position detector 62 includes a UWB communication section 111.

The UWB communication section 111 includes a UWB antenna 121, a UWB PHY (physical)-layer processor 122, a UWB MAC (Media Access Control)-layer processor 123, a UWB DLS (Data Link Control)-layer processor 124, and a UWB information calculator 125.

The UWB antenna 121 transmits and receives an impulse signal.

The UWB PHY-layer processor 122 performs a transmission signal modulating and demodulating process, a baseband signal modulating and demodulating process, a synchronization process, a transmission path measuring process, and a distance measuring process.

The UWB MAC-layer processor 123 controls the access or the transmission rate.

The UWB DLC-layer processor 124 performs neighboring node management, encryption, and authentication.

The UWB information calculator 125 calculates the position of the recording medium 42 from the result of the UWB communication performed by the UWB PHY-layer processor 122 through the UWB DLC-layer processor 124.

According to the UWB communication section 111 shown in FIG. 4, it is possible to calculate a distance between the recording medium 42 and the video camera 11 by allowing the recording medium 42 and the video camera 11 to transmit and receive packets therebetween. By fixing at least two communication devices making the UWB communication in a closed space such as indoors, it is possible to specify and detect a two-dimensional position of the recording medium 42 in the closed space. Details thereof will be described later with reference to FIG. 6.

Figure 5:
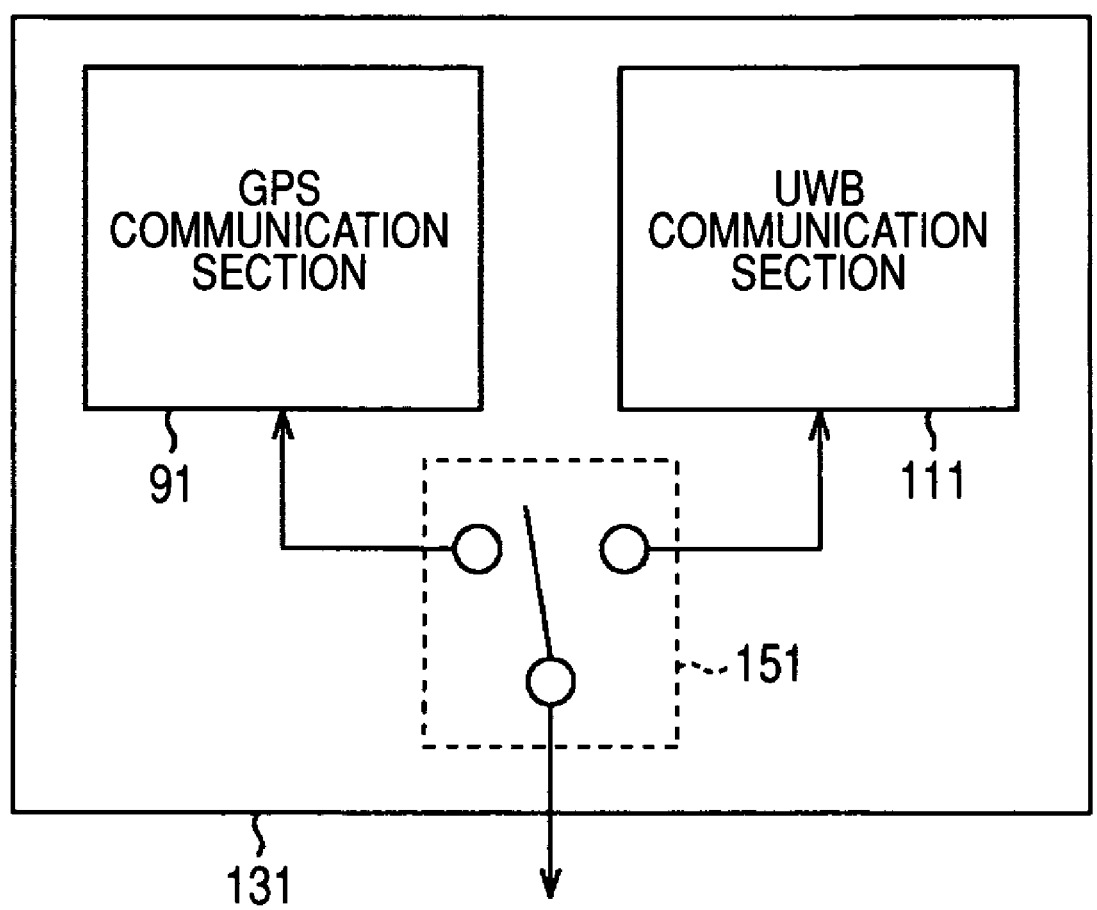
FIG. 5 is a block diagram illustrating a configuration of a communication section constituting the position detector.

FIG. 5 is a block diagram illustrating a third configuration of the position detector 62.

In FIG. 5, the position detector 62 includes a communication section 131.

The communication section 131 includes the GPS communication section 91 described with reference to FIG. 3, the UWB communication section 111 described with reference to FIG. 4, and a switch 151 selecting one of the GPS communication section 91 and the UWB communication section 111 under the control of the controller 66.

According to the communication section 131 shown in FIG. 5, by allowing the switch 151 to properly select one of the GPS communication section 91 and the UWB communication section 111, it is possible to detect the position of the recording medium 42 indoors and outdoors.

Figure 6:
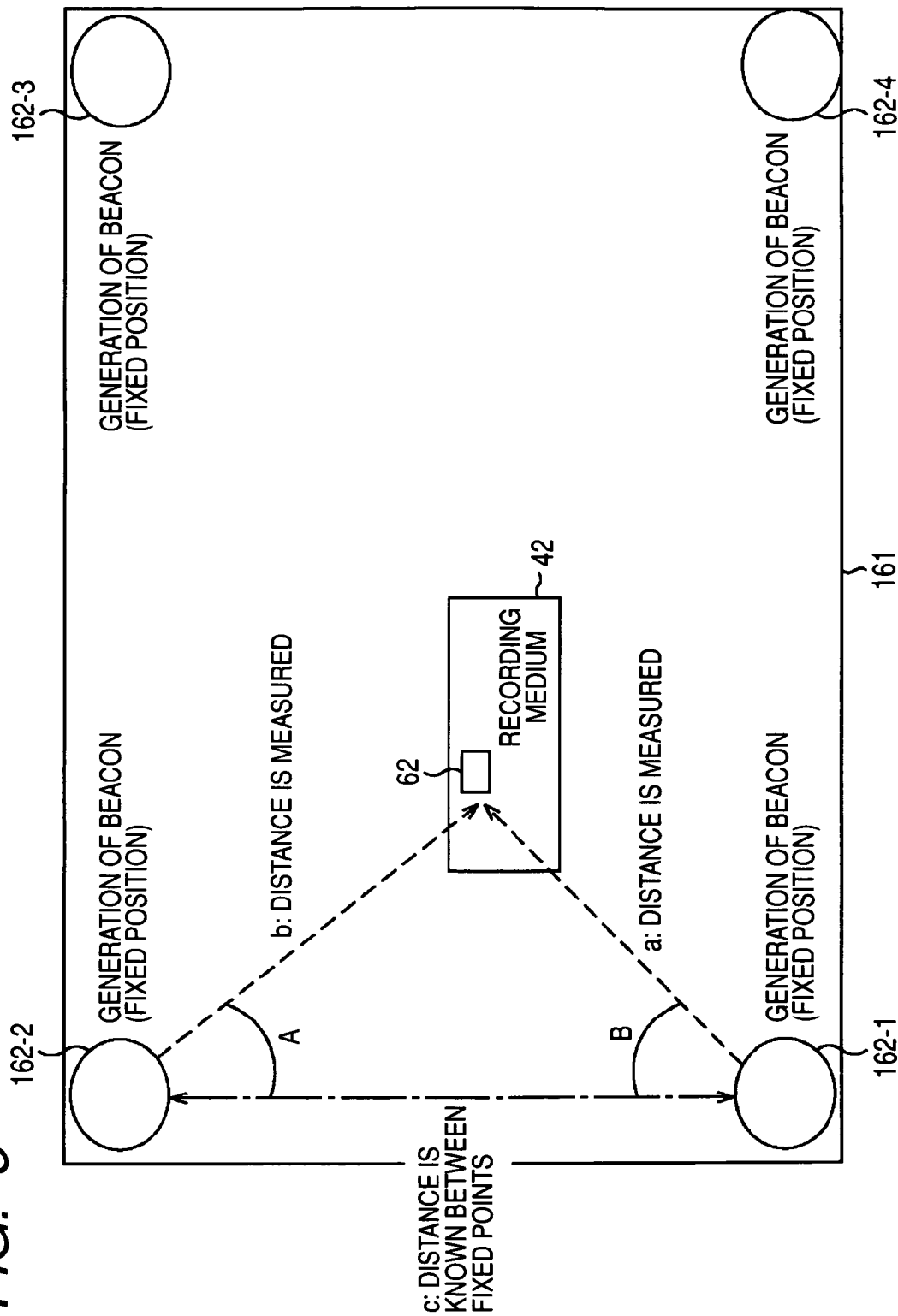
FIG. 6 is a diagram illustrating detection of a position of a recording medium by the use of UWB communication.

FIG. 6 is a diagram illustrating the position detection of the recording medium 42 using the UWB communication.

As shown in FIG. 6, UWB transmitters 162-1 to 162-4 are disposed at positions corresponding to four corners of a rectangular studio 161 and known in position information. The UWB transmitters 162-1 to 162-4 serve as UWB beacons transmitting a packet including the identification information thereof every predetermined time. When the distance between the recording medium 42 and at least two UWB transmitters of the UWB transmitters 162-1 to 162-4 can be acquired by allowing the position detector 62 of the recording medium 42 and the UWB transmitters 162-1 to 162-4 to transmit and receive packets therebetween, it is possible to detect the position of the recording medium 42 in the studio 161.

That is, in FIG. 6, the distance a between the UWB transmitter 162-1 and the recording medium 42 can be acquired by the use of the UWB communication. Similarly, the distance b between the UWB transmitter 162-2 and the recording medium 42 can be acquired by the UWB communication. The distance c between the UWB transmitter 162-1 and the UWB transmitter 162-2 is known in advance because of the known positions thereof.

By using the distances a, b, and c acquired in this way and the cosine theorem ($\cos A=(b^2+c^2-a^2)/2bc$, $\cos B=(c^2+a^2-b^2)/2ca$), angles A and B can be calculated, thereby detecting the position of the recording medium 42.

When three-dimensional position including the height direction is detected, the three-dimensional position can be detected by disposing plural UWB transmitters in the height direction.

The limitation on the use of data depending on the position of the recording medium 42 will be described now with reference to FIGS. 7 and 8.

Figure 7:
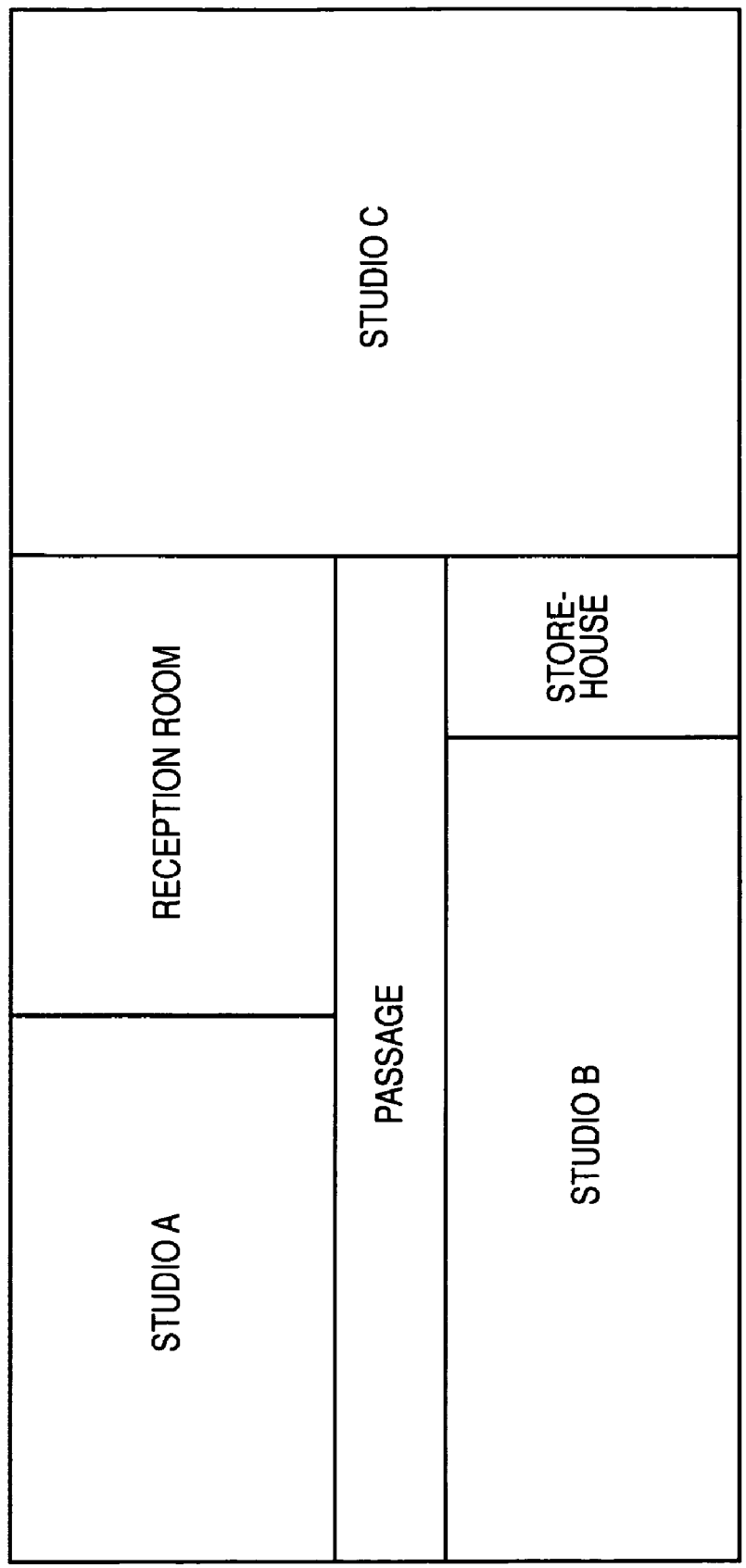
FIG. 7 is an arrangement diagram of a first floor of a building in which a user uses a recording medium.

FIG. 7 is an arrangement diagram of the first floor of a building in which a user uses the recording medium 42.

Referring to the arrangement diagram shown in FIG. 7, studio A and a reception room are arranged adjacent to each other on the upside of the drawing, and studio B and a storehouse are arranged adjacent to each other on the opposite side of studio A and the reception room with a passage interposed therebetween. Studio C is arranged in the blind passage (on the right side of the drawing).

Here, the floor shown in FIG. 7, for example, a three-dimensional coordinate system is defined in which a point on the bottom at the left-upper corner in FIG. 7 in studio A is used as an origin, the downward direction in FIG. 7 is the X axis direction, the right direction of FIG. 7 is the Y axis direction, and the direction from the bottom to the ceiling is the Z axis direction.

FIG. 8 is a diagram illustrating an example of the data holding level table 84 on the floor shown in FIG. 7 and recorded in the recording medium 42.

In FIG. 8, X0, Y0, and Z0 indicate start points in the three-dimensional coordinate system of studio A, studio B, studio C, the passage, the storehouse, and the reception rooms, and X1, Y1, and Z1 indicate end points in the three-dimensional coordinate system of the rooms.

Here, when it is assumed that the shapes of studios A, . . . in FIG. 7 are rectangular, the start point in the three-dimensional coordinate system of each room indicates a vertex closest to the origin of each rectangular room in the three-dimensional coordinate system, and the end point in the three-dimensional coordinate system of each room indicates a vertex most apart from the origin of each room in the three-dimensional coordinate system. That is, the area of each room in the three-dimensional coordinate system is specified by the coordinates of the start point as a vertex of a rectangle and the coordinates of the end point located at diagonal vertex.

The coordinates indicating the areas of the rooms in the three-dimensional coordinate system are set in the hatched portions denoted by "specification of coordinate range" of FIG. 8. In FIG. 8, "outdoors" includes all the coordinates other than the areas set as the coordinates in the floor.

The data holding level for the authenticated user on which the user authentication is correctly made in the recording medium 42 is shown in the second column from the right in FIG. 8, and the value indicating the data holding level is set depending on the areas corresponding to the respective rooms. The data holding level for the non-authenticated user on which the user authentication is not correctly made in the recording medium 42 is shown in the first column from the right in FIG. 8, and the value indicating the data holding level different from that for the authenticated user is set depending on the areas corresponding to the rooms.

Here, an integer in the range of 0 to 3 is set as the value indicating the data holding level.

When the data holding level is "3", the data of the data recording area 81 is readable and writable. When the data holding level is "2", the data of the data recording area 81 is only reproducible. When the data holding level is "1", the data of the data recording area 81 is protected. When the data holding level is "0", the data of the data recording area 81 is deleted.

In the examples shown in FIGS. 7 and 8, for example, when the user authentication section 63 succeeds in the user authentication successfully in the reception room (the authenticated user), the data holding level for the authenticated user correlated with the area of the reception room is "2" and thus the controller 66 allows the data of the data recording area 81 to be only reproduced. Accordingly, the user can reproduce (refer to) the data of the recording medium 42, but cannot edit or delete the data.

When the user authentication section 63 fails in the user authentication in the reception room (the non-authenticated user), the data holding level for the non-authenticated user correlated with the area of the reception room is "1" and thus the controller 66 protects the data of the data recording area 81. That is, the user cannot reproduce (refer to) the data of the recording medium 42, and cannot edit the data.

Here, for example, it is assumed that a monitoring camera is disposed in the passage and a user drops the recording medium 42 in the passage. Then, even when some one picks up the recording medium in the passage, such security to delete the data in the recording medium 42 is not necessary. Accordingly, regardless of the successfulness of the user authentication, the data holding level in the passage is set to "1", and a user picking up the recording medium 42 cannot edit and reproduce (refer to) the data of the recording medium 42 and cannot delete the data.

For example, it is assumed that studio B and the storehouse are not provided with a monitoring camera and are rooms which unauthorized persons frequently enter and leave. Unauthorized persons are outdoors, of course. In such places, it is not desirable that an authenticated user reproduces the data. When an unauthorized person picks up the recording medium 42, it is desirable that the security of the data is higher. Accordingly, in studio B and the storehouse, and outdoors, when the user authentication succeeds, the data holding level is set to "1", thereby allowing the authenticated user not to edit, reproduce (refer to), and delete the data of the recording medium 42. When the user authentication fails, the data holding level is set to "0" and the data of the recording medium 42 is deleted.

For example, when the recording medium 42 is stolen, the concealment of the recorded data is maintained by the data holding level corresponding to the position of the recording medium 42.

In this way, according to the data holding level table 84, the position (area) of the recording medium 42 and the authentication result of a user can be correlated with the data holding level (security level) of the data in the recording medium 42. The data hold level table 84 may be prepared in the unit of data or in the unit of folders including plural data.

A process of initializing the recording medium 42 will be described now.

FIG. 9 is a flowchart illustrating the process of initializing the recording medium 42.

The process of initializing the recording medium 42 is started when an instruction for initializing the recording medium 42 is supplied to the recording medium 42 from the video camera 11 by connecting the recording medium 42 to the video camera 11 and allowing a user to operate the operation input section not shown in the video camera 11 in a communicable state. At this time, the transmission and reception controller 33 of the video camera 11 transmits the identification information input by the user to the recording medium 42.

In step S11, the transmission and reception controller 58 of the recording medium 42 receives the identification information transmitted from the transmission and reception controller 33 of the video camera 11 and supplies the received identification information to the identification information storage 60 via the bus 68.

In step S12, the transmission and reception controller 58 of the recording medium 42 receives the user information input to the video camera 11 by the user and transmitted therefrom and the setting information on a data holding level and supplies the received information to the recording section 61 via the bus 68. The recording section 61 records the user information used for the data holding table 84 shown in FIG. 8 and supplied from the transmission and reception controller 58 and the setting information on a data holding level in the user authentication information recording area 83 and the data holding level table 84, respectively, and then the process is ended.

When the recording medium 42 is made to operate only by the combination with a specific video camera 11, the video camera 11 may transmit a device specifying ID such as the manufacture number of the video camera 11, and the device specifying ID may be received by the transmission and reception controller 58 of the recording medium 42 and may be recorded by the recording medium 61 in step S12.

The initialization process is performed when the recording medium 42 is first used or the user information and the data holding level table 84 recorded in the recording medium 42 is changed.

Although the initialization process of the recording medium 42 is performed by allowing a user to operate the video camera 11 connected to the recording medium 42, the recording medium 42 may be operated by connecting the recording medium to a personal computer in which a dedicated application is installed and allowing a user to operate the personal computer.

FIG. 10 is a flowchart illustrating a data use limitation process in the recording medium 42.

In the following description, it is assumed that the data use limitation process is performed in a communicable state with the video camera 11 and the data to be limited on the use thereof is individual data recorded in the data recording area 81 of the recording section 61.

In step S31, the user authentication section 63 determines whether the user information is supplied via the bus 68.

When it is determined in step S31 that the user information is supplied, that is, for example, when a user intending to use the data of the recording medium 42 inputs the user information by operating the operation input section not shown and the user information is supplied from the video camera 11, the operation of step S32 is performed, that is, the user authentication section 63 authenticates the user intending to use the data of the recording medium 42 on the basis of the user information supplied from the video camera 11 and the user information recorded in the user authentication information recording area 83 of the recording section 61. When it succeeds in authentication, the user authentication section 63 turns on the user authentication flag of the user authentication information recording area 83 and supplies the lighting instruction to the user-authenticated state displaying LED 64, and then the operation of step S33 is performed.

When it fails in authentication in step S32, the user authentication section 63 turns off the user authentication flag and supplies the extinction instruction to the user-authenticated state displaying LED 64, and then the operation of step S33 is performed.

On the other hand, when it is determined in step S31 that the user information is not supplied, the operation of step S31 is repeated until the user information is supplied.

In step S33, the position detector 62 detects the position of the recording medium 42 every predetermined time indicated by the timer 69 and supplies the position information indicating the position to the position information recording area 82 of the recording section 61. Then, the operation of step S34 is performed. In step S34, the controller 66 determines whether the data hold level corresponding to the position information recorded in the position information recording area 82 and the user authentication result indicated by the user authentication flag of the user authentication information recording area 83 is "0" on the basis of the data holding level table 84.

Here, when the user authentication flag of the user authentication information recording area 83 is turned on, that is, when the user authentication succeeds, the controller 66 refers to the data holding level for the authenticated user in the data holding level table 84 shown in FIG. 8. When the user authentication flag of the user authentication information recording area 83 is turned off, that is, when the user authentication fails, the controller 66 refers to the data holding level for the non-authenticated user in the data holding level table 84 shown in FIG. 8.

When the data holding level is "0" in step S34, the operation of step S35 is performed, that is, the controller 66 deletes the data recorded in the data recording area 81. Thereafter, the operation of step S36 is performed, that is, the controller 66 determines whether the entire data recorded in the data recording area 81 is deleted.

When it is determined in step S36 that the entire data recorded in the data recording area 81 is deleted, the process is ended.

On the other hand, when it is determined in step S36 that the entire data recorded in the data recording area 81 is not deleted, the operation of step S44 is performed.

On the other hand, when the data holding level is not "0" in step S34, the operation of step S37 is performed.

In step S37, the controller 66 determines whether the data hold level corresponding to the position information recorded in the position information recording area 82 and the user authentication result indicated by the user authentication flag of the user authentication information recording area 83 is "1" on the basis of the data holding level table 84. When the data holding level is "1", the operation of step S38, that is, the controller 66 protects the data recorded in the data recording area 81 from being read and written. Thereafter, the operation of step S44 is performed.

On the other hand, when the data holding level is not "1" in step S37, the operation of step S39 is performed.

In step S39, the controller 66 determines whether the data hold level corresponding to the position information recorded in the position information recording area 82 and the user authentication result indicated by the user authentication flag of the user authentication information recording area 83 is "2" on the basis of the data holding level table 84. When the data holding level is "2", the operation of step S40 is performed, that is, the controller 66 allows the data recorded in the data recording area 81 to be only reproduced. Thereafter, the operation of step S44 is performed.

On the other hand, when the data holding level is not "2" in step S39, the operation of step S41 is performed.

In step S41, the controller 66 determines whether the data hold level corresponding to the position information recorded in the position information recording area 82 and the user authentication result indicated by the user authentication flag of the user authentication information recording area 83 is "3" on the basis of the data holding level table 84. When the data holding level is "3", the operation of step S42 is performed, that is, the controller 66 allows the data recorded in the data recording area 81 to be read and written. Thereafter, the operation of step S44 is performed.

On the other hand, when the data holding level is not "3" in step S41, that is, when the controller 66 cannot determine to which area in the data holding level table 84 the position information detected by the position detector 62 corresponds due to a communication error or the like in the process of detecting the position in the position detector 62, the operation of step S43 is performed.

In step S43, the controller 66 holds the previous data use limitation state and then the operation of step S44 is performed.

In step S44, the transmission and reception controller 58 determines whether the communication with the video camera 11 is disabled. When it is determined in step S44 that the communication with the video camera 11 is disabled, the operation of step S45 is performed.

In step S45, the user authentication section 63 makes the user authentication result invalid. More specifically, when the user authentication flag in the user authentication information recording area 83 is in the ON state, the user authentication section 63 turns off the user authentication flag and supplies the extinction instruction to the user-authenticated state displaying LED 64. Then, the operation of step S31 is performed again.

When the user authentication flag in the user authentication information recording area 83 is in the OFF state in step S45, the user authentication section 63 maintains the user authentication flag in the OFF state and maintains the user-authenticated state displaying LED 64 in the extinguished state. Then, the operation of step S31 is performed again.

When the communication between the recording medium 42 and the video camera 11 is disabled by allowing the video camera 11 and the recording medium 42 communicating with each other by the wireless communication or the non-contact communication to get apart from each other, the frequent authentication process for each disabled communication in the boundary between the enabled communication and the disabled communication causes users to feel troublesome. Accordingly, for example, when the elapse of time after the communication with the video camera 11 is disabled is greater than or equal to a threshold value, it may be determined in step S44 that the communication is disabled, thereby providing a margin of time.

On the other hand, when it is determined in step S44 that the communication with the video camera 11 is enabled, the operation of step S46, that is, the user authentication section 63 determines whether a predetermined time passes after the user authentication process.

When it is determined in step S46 that the predetermined time does not pass after the user authentication process, the operation of step S33 is performed again and the operations subsequent thereto are repeated.

On the other hand, when it is determined in step S46 that the predetermined time passes after the user authentication process, the user authentication section 63 supplies the blinking instruction to the user-authenticated state displaying LED 64 regardless of the successfulness of the user authentication. Then, the operation of step S47 is performed.

In step S47, the user authentication section 63 supplies or transmits the instruction for displaying a timeout alarming message, which indicates that the time for the authenticated user is soon over, to the video camera 11 via the bus 68, the transmission and reception controller 58, and one of the first antenna 54, the second antenna 55, and the connection terminal 56. Then, the operation of step S48 is performed.

In step S48, the user authentication section 63 determines whether the user-authenticated state holding request button 65 is pressed for a predetermined time after the predetermined time passes in step S46. When the user-authenticated state holding request button 65 is pressed, the user authentication section 63 is supplied with information indicating that the user-authenticated state is held from the user-authenticated state holding request button 65. Then, when the user authentication succeeds in step S32, the user authentication section 63 supplies the lighting instruction to the user-authenticated state displaying LED 64. When the user authentication fails in step S32, the user authentication section 63 supplies the extinction instruction to the user-authenticated state displaying LED 64. That is, the user-authenticated state displaying LED 64 returns to the state before being blinked. Thereafter, the process is returned to step S33 from step S48.

The user-authenticated state displaying LED 64 is blinked regardless of the successfulness of the user authentication in step S46. However, when the user authentication fails, the user-authenticated state displaying LED 64 may be extinguished after step S46.

On the other hand, when it is determined in step S48 that the user-authenticated state holding request button 65 is not pressed, the operation of step S45 is performed, that is, the user authentication section 63 makes the user authentication result invalid. More specifically, when the user authentication flag of the user authentication information recording area 83 is in the ON state, the user authentication section 63 turns off the user authentication flag and supplies the extinction instruction to the user-authenticated state displaying LED 64. Then, the operation of step S31 is performed again.

When the user authentication flag of the user authentication information recording area 83 is in the OFF state in step S45, the user authentication section 63 maintains the user authentication flag in the OFF state and maintains the user-authenticated state displaying LED 64 in the extinguished state. Then, the operation of step S31 is performed again.

In this way, the access to the data recorded in the recording medium 42 is limited depending on the area including the position of the recording medium 42 and the user authentication result, which are correlated in the data holding level table 84, and the level thereof can be properly set, thereby enhancing the concealment and security of the data recorded in the recording medium 42.

In the above-mentioned description, the target of the data use limitation is individual data recorded in the data recording area 81 of the recording section 61, but may be the entire data in the data recording area 81 of the recording section 61 or a folder or file including plural data.

In the above-mentioned description, the data use limitation process in the recording medium 42 is performed in the state where the recording medium 42 is communicable with the video camera 11, but may be performed in a state where the recording medium 42 is connected to a personal computer, etc. in which a dedicated application is installed and is communicable with the personal computer.

Here, the recording medium 42 has a position detecting function. Accordingly, the position detecting function can be used as the user authentication method.

A user authentication process using a movement trace of the recording medium 42 having the position detecting function will be described now.

Figure 11:
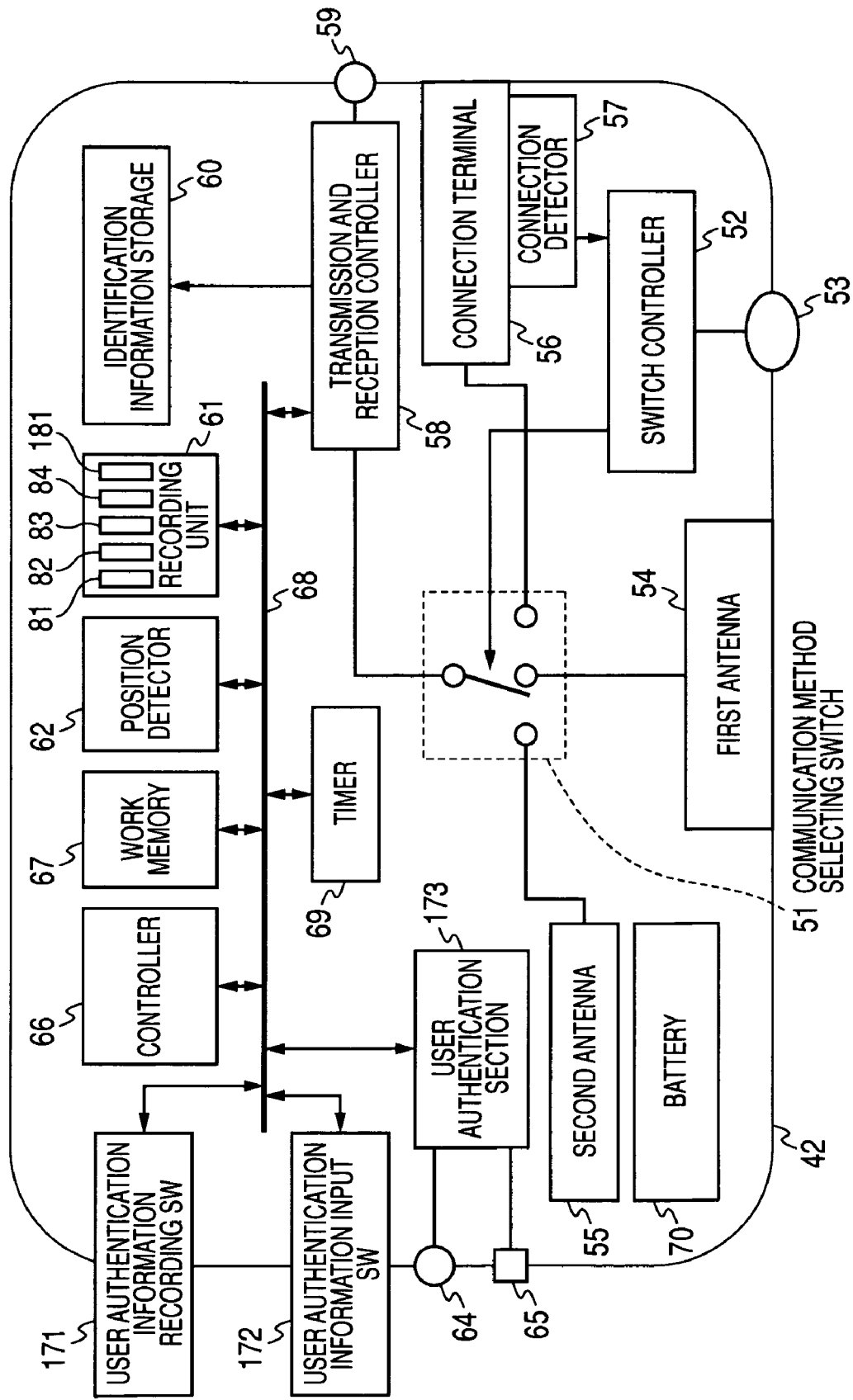
FIG. 11 is a block diagram illustrating another configuration of the recording medium.

FIG. 11 is a block diagram illustrating another configuration of the recording medium 42 that can perform the user authentication using the position detection.

In FIG. 11, the recording medium 42 includes a communication method selecting switch 51, a switch controller 52, a loading detection switch 53, a first antenna 54, a second antenna 55, a connection terminal 56, a connection detector 57, a transmission and reception controller 58, an access displaying LED 59, an identification information storage 60, a recording section 61, a position detector 62, a user-authenticated state displaying LED 64, a user-authenticated state holding request button 65, a controller 66, a work memory 67, a bus 68, a timer 69, a battery 70, a user authentication information storage switch (SW) 171, a user authentication information input switch (SW) 172, and a user authentication section 173.

The recording section 61 includes a data recording area 81, a position information recording area 82, a user authentication information recording area 83, a data holding level table 84, and a trace data recording area 181.

In FIG. 11, elements corresponding to FIG. 2 are denoted by like reference numerals and description thereof is properly omitted. That is, FIG. 11 shows basically the same configuration as described with reference to FIG. 2, except that the user authentication section 173 is provided instead of the user authentication section 63 and the user authentication information recording SW 171, the user authentication information input SW 172, and the trace data recording area 181 are additionally provided.

In the period of time when the user authentication information recording SW 171 is pressed by a user, the position of the recording medium 42 is sequentially detected by the position detector 62 every predetermined time and is recorded in the trace data recording area 181. That is, in the period of time when the user authentication information recording SW 171 is pressed by the user, the trace data indicating the movement trace of the position of the recording medium 42 is recorded in the trace data recording area 181.

At this time, a candidate flag is assigned to the trace data recorded in the trace data recording area 181 and plural trace data to which the candidate flags are assigned are recorded in the trace data recording area 181.

By loading or connecting the recording medium 42 into or to the video camera 11 and operating an operation input section not shown in the video camera 11, the user displays the plural trace data, which the candidate flags are assigned to and which is recorded in the trace data recording area 181 of the recording medium 42, on the display unit 43 of the video camera 11. At this time, the user authentication section 173 deletes the candidate flag of the trace data selected by the user having confirmed the trace data and records the selected trace data as standard pattern data in the trace data recording area 181. The standard pattern data is used as the user information for authenticating a user, and the process of deleting the candidate flag of the trace data selected by the user and recording the selected trace data as the standard pattern data in the trace data recording area 181 corresponds to the process of recording the user information in step S12 of FIG. 9.

In the period of time when the user authentication information input SW 172 is pressed by the user, that is, in the period of time corresponding to step S31 in FIG. 10, the position of the recording medium 42 is sequentially detected by the position detector 62 every predetermined time and is recorded in the trace data recording area 181. That is, in the period of time when the user authentication information input SW 172 is pressed by the user, the trace data indicating the movement trace of the recording medium 42 is recorded as the input data in the trace data recording area 181.

The user authentication section 173 performs a DP (Dynamic Programming) matching process on the input data and the standard pattern data recorded in the trace data recording area 181 and authenticates the user on the basis of the result.

Figure 12:
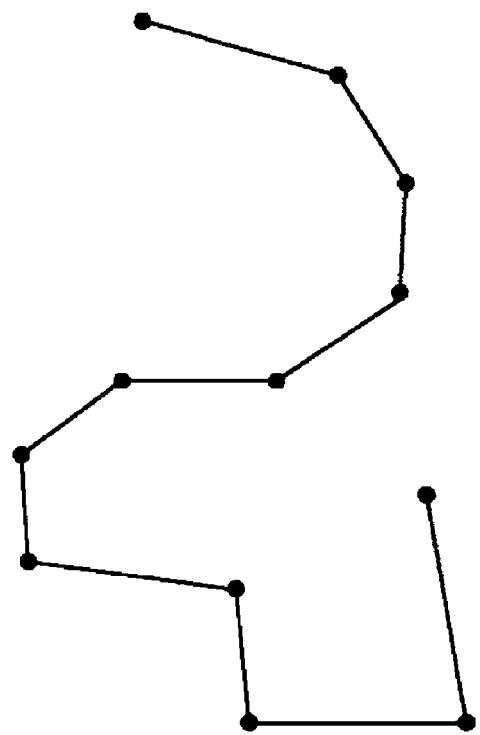
FIG. 12 is a diagram illustrating standard pattern data recorded in a trace data recording area.

FIG. 12 is a diagram illustrating an example of the standard pattern data recorded in the trace data recording area 181.

The standard pattern data shown in FIG. 12 is obtained by sequentially detecting the positions of twelve sampling points and recording the detected positions in the trace data recording area 181 in the period of time when the user authentication information recording SW 171 is pressed in the moving recording medium 42.

Figure 13:
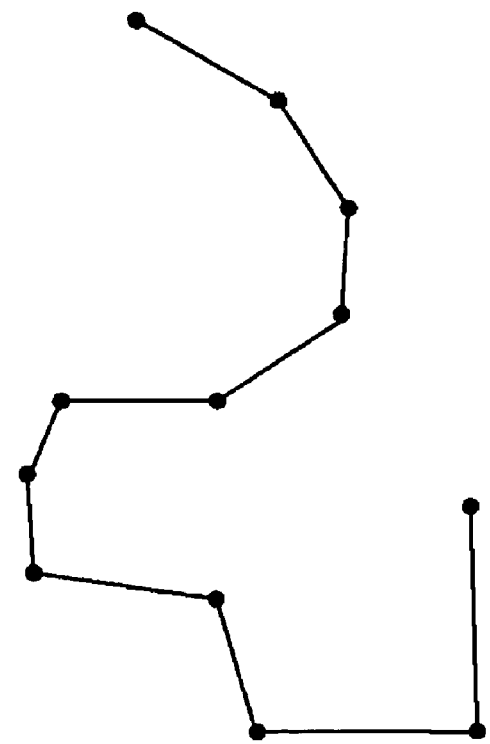
FIG. 13 is a diagram illustrating input data recorded in the trace data recording area.

FIG. 13 is a diagram illustrating an example of the input data recorded in the trace data recording area 181.

The input data shown in FIG. 13 is obtained by sequentially detecting the positions of twelve sampling points and recording the detected positions in the trace data recording area 181 in the period of time when the user authentication information input SW 172 is pressed in the moving recording medium 42.

The user authentication section 173 performs the DP matching process on the standard pattern data shown in FIG. 12 and the input data shown in FIG. 13. At this time, the standard pattern data shown in FIG. 12 is not completely equal to the input data shown in FIG. 13, but the user authentication section 173 can authenticate the user by calculating the distance between the standard pattern data and the input data on the basis of the DP matching process.

Figure 14:
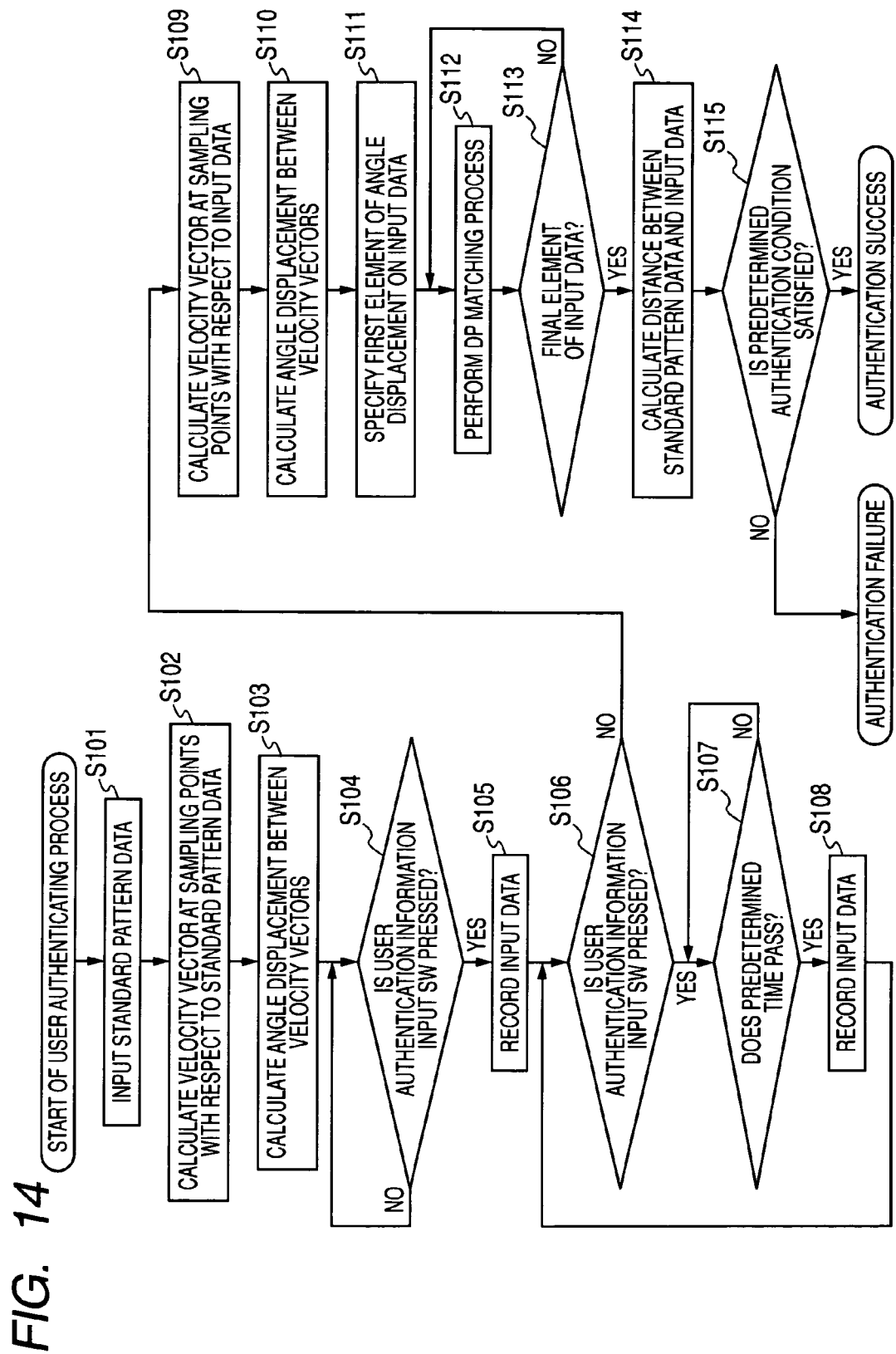
FIG. 14 is a flowchart illustrating a process of authenticating a user of the recording medium shown in FIG. 11.

FIG. 14 is a flowchart illustrating a process of authenticating a user of the recording medium 42 described with reference to FIG. 11.

In step S101, the user authentication section 173 records the standard pattern data in the trace data recording area 181. Then, the operation of step S102 is performed.

That is, when the user presses the user authentication information recording SW 171 and allows the recording medium 42 to move with the pressed state maintained, the position detector 62 detects the position of the recording medium 42 every predetermined time. The position of the recording medium 42 detected by the position detector 62 is sequentially supplied to the trace data recording area 181 via the bus 68 and is recorded therein.

In the trace data recording area 181, the recording of the position of the recording medium 42 detected by the position detector 62 is continued while the user authentication information recording SW 171 is being pressed, and is stopped when the user releases the user authentication information recording SW 171. Accordingly, the trace data indicating the trace of position of the recording medium 42 in the period of time when the user authentication information recording SW 171 is being pressed is recorded in the trace data recording area 181. At this time, a candidate flag is assigned to the trace data.

When the recording medium 42 is loaded, for example, into the video camera 11 after one or more trace data are recorded in the trace data recording area 181 along with the candidate flag, one or more trace data recorded in the trace data recording area 181 is transmitted to the video camera 11 from the recording medium 42 and is displayed on the display unit 43.

When the user operates the operation input section not shown so as to select one of the one or more trace data displayed on the display unit 43, an operation signal corresponding to the operation is supplied to the recording medium 42 from the video camera 11.

In the recording medium 42, the operation signal from the video camera 11 is supplied to the user authentication section 173 and the user authentication section 173 deletes the candidate flag of one trace data selected by the user among the one or more trace data recorded in the trace data recording area 181 in accordance with the operation signal from the video camera 11.

Among the one or more trace data recorded in the trace data recording area 181, the trace data to which the candidate flag is not assigned is treated as the standard pattern data.

In step S102, the user authentication section 173 calculates velocity vectors of the sampling points (points of which the positions are detected) with respect to the standard pattern data recorded in the trace data recording area 181. Then, the operation of step S103 is performed.

In step S103, the user authentication section 173 calculates an angle displacement between the velocity vectors adjacent to each other in time series. Then, the operation of step S104 is performed.

Here, the angle displacement will be described now with reference to FIG. 15.

Figure 15:
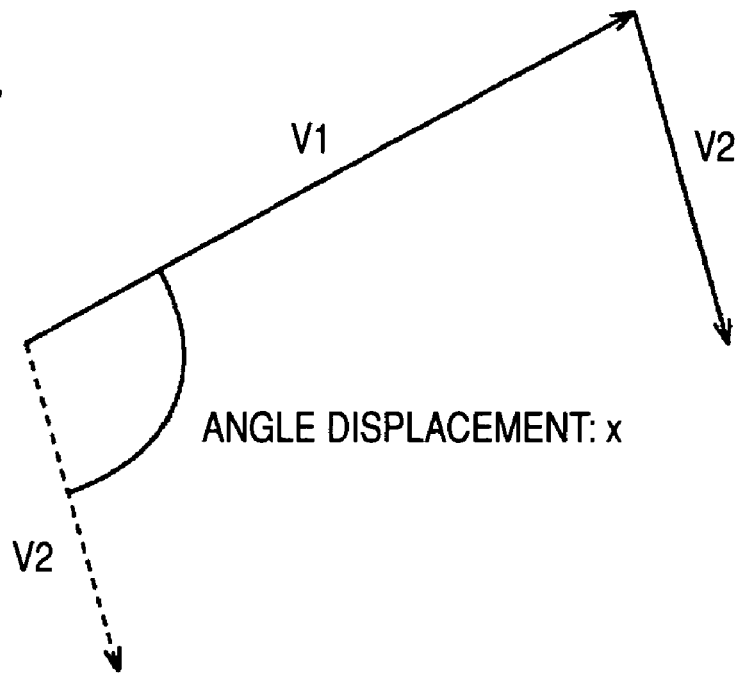
FIG. 15 is a diagram illustrating an angle displacement.

As shown in FIG. 15, it is assumed that the velocity vector of the recording medium 42 detected at a certain time is V1 and the velocity vector detected at another time is V2. Then, when the velocity vector V2 is made to move so that the start points of the velocity vector V1 and the velocity vector V2 are matched, the angle formed by the velocity vector V1 and the velocity vector V2 is an angle displacement x.

Referring to FIG. 14 again, the operations of steps S101 to S103 should be performed at least once and may be skipped after the operations are performed once. That is, the operations of steps S101 to S103 can be performed when new standard pattern data is recorded in the trace data recording area 181 or when the standard pattern data recorded in the trace data recording area 181 is changed.

In step S104, the position detector 62 determines whether the user authentication information input SW 172 is pressed. When it is determined that the user authentication information input SW 172 is not pressed, the operation of step S104 is repeated.

When it is determined in step S104 that the user authentication information input SW 172 is pressed, the operation of step S105 is performed, that is, the position detector 62 supplies the detected position of the recording medium 42 as the input data to the trace data recording area 181 and records the input data therein. Then, the operation of step S106 is performed. The input data indicates the first position detected after the user authentication information input SW 172 is pressed.

In step S106, the position detector 62 determines whether the user authentication information input SW 172 is pressed. When the user authentication information input SW 172 is pressed continuously from step S104, the process goes from step S106 to step S107 and the position detector 62 determines whether a predetermined time passes after the previous recording (detecting) of the position of the recording medium 42. When the predetermined time does not pass, the operation of step S107 is repeated until the predetermined time passes.

When it is determined in step S107 that the predetermined time passes, the position detector 62 supplies the detected position of the recording medium 42 as the input data to the trace data recording area 181 and records the detected position therein. Then, the operation of step S106 is performed again.

On the other hand, when it is determined in step S106 that the user authentication information input SW 172 is not pressed, the operation of step S109 is performed.

In step S109, the user authentication section 173 calculates the velocity vectors of the sampling points with respect to the input data input while the user authentication information input SW 172 is pressed. Then, the operation of step S110 is performed.

In step S110, the user authentication section 173 calculates the angle displacement between the velocity vectors adjacent to each other in time series as shown in FIG. 15. Then, the operation of step S111 is performed.

In step S111, the user authentication section 173 designates the first element of the angle displacement in the input data and then, the operation of step S112 is performed.

In step S112, the user authentication section 173 performs the DP matching process between the first element of the angle displacement in the input data and the first element of the angle displacement in the standard pattern data. Then, the operation of step S113 is performed.

In step S113, the user authentication section 173 determines whether the input data having been subjected to the DP matching process in step S112 is the final element. When the input data is not the final element, the operation of step S112 is performed again and the DP matching process is performed on the second elements of the angle displacement in the input data and the angle displacement in the standard pattern data. Thereafter, the DP matching process is performed on the third elements, the fourth elements, . . . , and the final elements.

In the DP matching process, when a two-dimensional arrangement for calculating the distance between the standard pattern data and the input data is expressed by $g(i, j)$ (where i represents an element of the angle displacement in the input data and j represents an element of the angle displacement in the standard pattern data) and the absolute value of a difference between the element i of the angle displacement and the element j of the angle displacement is expressed by $d(i, j)$, the two-dimensional arrangement $g(i, j)$ is calculated as follows using a general recurrence equation.

$$g(i, j) = \min(g(i-1, j) + d(i, j), g(i-1, j-1) + 2d(i, j), g(i, j-1) + d(i, j))$$

In the DP matching process in step S112, a corrected amount $\Delta$ is introduced into the difference $d(i, j)$ and the difference $d(i, j)$ is replaced with $\min(d(i, j) - \Delta, d(i, j))$.

Since the blur increases as the difference between the velocity vector of the input data and the velocity vector of the standard pattern data increases and thus the accurate matching between the patterns becomes more difficult, the corrected amount Δ is introduced to absorb and correct a slight blur occurring between the angle displacement of the input data and the angle displacement of the standard pattern data.

Figure 16:
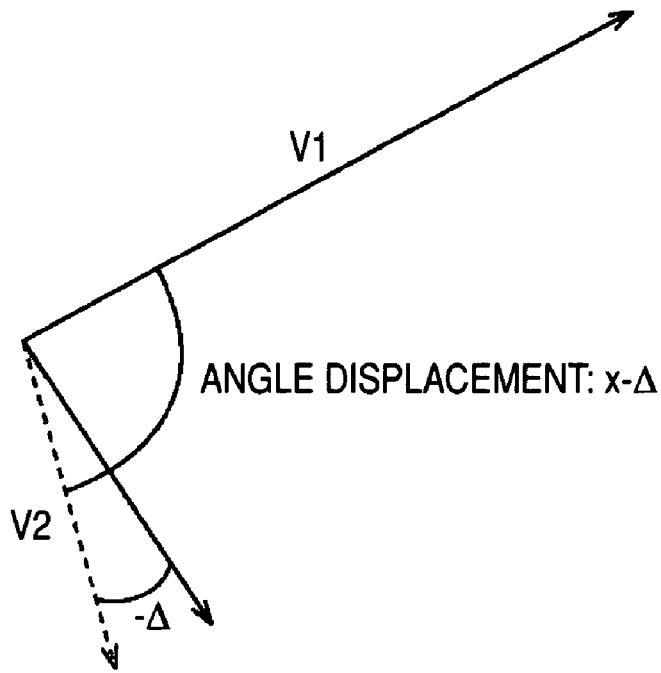
FIG. 16 is a diagram illustrating a corrected amount of the angle displacement.

FIG. 16 is a diagram illustrating the angle displacement x−Δ reduced by the corrected amount Δ.

Here, the corrected amount Δ is set to be Δ=α*|(|V2|−|V1|)| obtained by multiplying the absolute value of the difference in magnitude between the velocity vectors V1 ad V2 by the counted value α. Since too great counted value is not suitable as data for authentication, the counted value α can be set to a suitable value.

When the distance between the standard pattern data and the input data rather increases by performing the correction operation, the correction need not be performed. Accordingly, to utilize the smaller value (minimum value) of the difference d(i, j) having been corrected using the corrected amount Δ and the difference not having been corrected, the difference d(i, j) is replaced with min(d(i, j)−Δ, d(i, j)).

Accordingly, the recurrence equation for calculating the two-dimensional arrangement g(i, j) is expressed as follows.

$$g(i,j)=\min(g(i-1,j)+\min(d(i,j)-\Delta, d(i,j)), g(i-1, j-1)+2*\min(d(i,j)-\Delta, d(i,j)), g(i,j-1)+\min(d(i,j)-\Delta, d(i,j)))$$

Referring to FIG. 14 again, when it is determined in step S113 that the input data having been subjected to the DP matching process in step S112 is the final element, the operation of S114 is performed.

In step S114, the user authentication section 173 calculates the distance between the standard pattern data and the input data. Then, the operation of step S115 is performed.

In step S115, the user authentication section 173 determines whether a predetermined authentication condition is satisfied. More specifically, it is determined whether the distance between the standard pattern data and the input data is equal to or less than a predetermined threshold value.

When it is determined in step S115 that the distance between the standard pattern data and the input data is equal to or less than the predetermined threshold value, the user authentication succeeds and the process is ended. On the other hand, when it is determined that the distance between the standard pattern data and the input data is greater than the predetermined threshold value, the user authentication fails and the process is ended.

In this way, only by allowing the position of the recording medium 42 to move, the user of the recording medium 42 can be specified. Accordingly, it is possible to simply authenticate a user, without inputting a password or requiring an interface for acquiring an image for authenticating a fingerprint unlike the related art.

In the above-mentioned description, by loading or connecting the recording medium 42 into or to the video camera 11 at the time of performing the user authentication process of the recording medium 42, the standard pattern data is selected from the plural trace data displayed on the display unit 43. However, by connecting the recording medium 42 to a personal computer in which a dedicated application is installed and operating an operation input section such as a keyboard, the standard pattern data may be selected from the plural trace data displayed on the display unit.

As described above, in the recording medium 42, since the position of the recording medium 42 is detected, a user intending to use the data is authenticated, the data holding level table 84 in which the area information indicating the area and the authentication result are correlated with the data holding level indicating a degree of limitation on the use of data is recorded, and the limitation on the user's use of data is controlled on the basis of the data holding level correlated with the area information including the position detected by the position detector 62 and the authentication result of the user authentication section 63 in the data holding level table 84, it is possible to enhance the concealment and security of data recorded in the recording medium 42.

Although the embodiment in which the invention is applied to the recording medium 42 loaded into or connected to the video camera 11 has been described, the invention may be applied to a recording medium connected to an imaging apparatus such as a digital camera or an information processing device such as a personal computer and a recording medium disposed in a portable terminal such as a PDA (Personal Digital Assistant) and a mobile phone.

A series of processes such as the above-mentioned data use limitation process may be carried out by hardware or software. When the series of processes are carried out by software, programs constituting the software are installed from a program recording medium in a computer having a dedicated hardware built therein or a general-purpose personal computer executing various functions by installing various programs therein.

Figure 17:
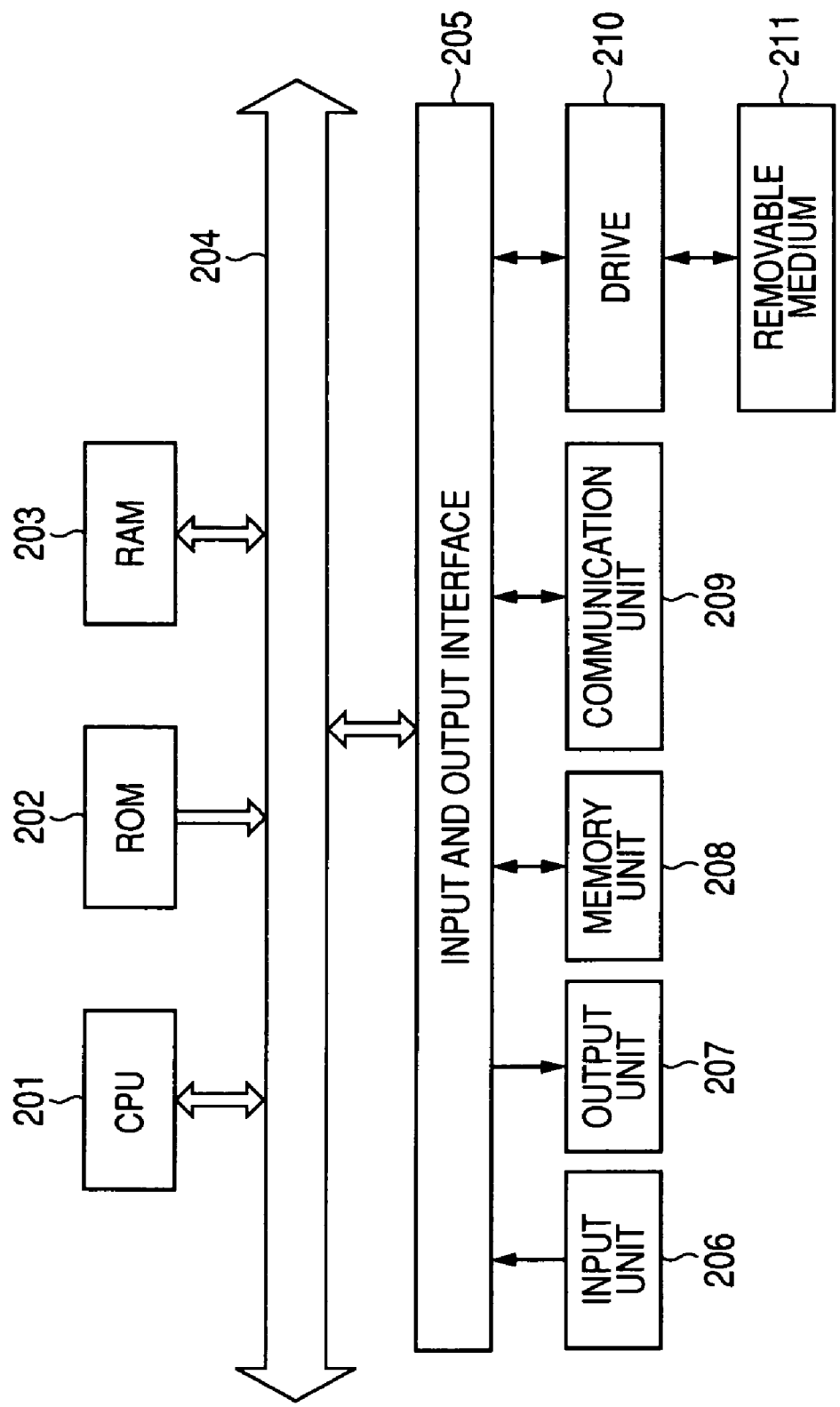
FIG. 17 is a block diagram illustrating a hardware configuration of a computer serving as an information processing device according to an embodiment of the invention is applied.

FIG. 17 is a block diagram illustrating a hardware configuration of a computer for carrying out the series of processes by the use of programs.

In the computer, a CPU (Central Processing Unit) 201, a ROM (Read Only Memory) 202, and a RAM (Random Access Memory) 203 are connected to each other through a bus 204.

An input and output interface 205 is additionally connected to the bus 204. The input and output interface 205 is connected to an input unit 206 including a keyboard, a mouse, and a microphone, an output unit 207 including a display and a speaker, a memory unit 208 including a hard disc or a non-volatile memory corresponding to the recording section 61, a communication unit 209 including a network interface, and a drive 210 driving a removable medium 211 such as a magnetic disc, an optical disc, an magnetooptic disc, and a semiconductor memory.

In the computer having the above-mentioned configuration, by allowing the CPU 201 to load the programs stored in the memory unit 208 into the RAM 203 via the input and output interface 205 and the bus 204 and to execute the programs, for example, the above-mentioned series of processes are carried out.

The programs executed by the computer (CPU 201) may be recorded in the removable medium 211 as a package medium including, for example, a magnetic disc (including a flexible disc), an optical disc (such as CD-ROM (Compact Disc-Read Only memory) and DVD (Digital Versatile Disc)), a magnetooptic disc, or a semiconductor memory, or may be provided by the use of a wired or wireless transmission medium such as a local area network, Internet, and a digital satellite broadcasting.

The programs may be installed in the memory unit 208 via the input and output interface 205 by loading the removable medium 211 into the drive 210. The programs may be received by the communication unit 209 and installed in the memory unit 208 via wire or wireless transmission medium. In addition, the programs may be installed in advance in the ROM 202 or the memory unit 208.

The programs executed by the computer may be programs for performing the processes in time series in the procedure described herein, or may be programs for performing the processes in parallel or at a necessary time such as when they are called.

The invention is not limited to the above-mentioned embodiments, but may be modified in various forms without departing from the gist of the invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A recording medium in which data supplied from an information processing device is recorded, the recording medium comprising:
   position detecting means for detecting a position of the recording medium;
   user authentication means for authenticating a user intending to use the data;
   recording means for recording data use limitation information; and
   data use limitation control means for controlling the limitation on the user's use of data on the basis of the data use limitation information.

2. The recording medium according to claim 1, wherein area information indicating an area and the authentication result are correlated with a data use limitation level indicating a degree of limitation on the use of data in the data use limitation information.

3. The recording medium according to claim 2, wherein the data use limitation control means controls the limitation on the user's use of data on the basis of the data use limitation level correlated with the area information including the position detected by the position detecting means and the authentication result of the user authentication means in the data use limitation information.

4. The recording medium according to claim 1, wherein the data use limitation information is recorded in the unit of data or in the unit of folders including a plurality of data.

5. The recording medium according to claim 2, wherein the data use limitation level includes a level in which the data can be recorded, reproduced, and edited, a level in which the data can be only reproduced, a level in which the data cannot be recorded, reproduced, or edited, and a level in which the data is deleted.

6. A data use limitation method in a recording medium in which data supplied from an information processing device is recorded, the method comprising the steps of:
   detecting a position of the recording medium;
   authenticating a user intending to use the data;
   recording data use limitation information; and
   controlling limitation on the user's use of data on the basis of the data use limitation information.

7. A program allowing a computer to serve as a recording medium in which data supplied from an information processing device is recorded, the program allowing the computer to serve as:
   position detecting means for detecting a position of the recording medium;
   user authentication means for authenticating a user intending to use the data;
   recording means for recording data use limitation information; and
   data use limitation control means for controlling the limitation on the user's use of data on the basis of the data use limitation information.

8. A recording medium in which data supplied from an information processing device is recorded, the recording medium comprising:
   a position detecting unit configured to detect a position of the recording medium;
   a user authentication unit configured to authenticate a user intending to use the data;
   a recording unit configured to record data use limitation information; and
   a data use limitation control unit configured to controlling the limitation on the user's use of data on the basis of the data use limitation information.

* * * * *